United States Patent
Martens

(10) Patent No.: US 11,174,027 B2
(45) Date of Patent: Nov. 16, 2021

(54) VEHICLE DOCKING SYSTEMS, PAYLOAD TRANSFER SYSTEMS, AND RELATED METHODS

(71) Applicant: The Boeing Company, Chicago, IL (US)

(72) Inventor: Eric John Martens, Crestwood, MO (US)

(73) Assignee: The Boeing Company, Chicago, IL (US)

( * ) Notice: Subject to any disclaimer, the term of this patent is extended or adjusted under 35 U.S.C. 154(b) by 447 days.

(21) Appl. No.: 16/047,966

(22) Filed: Jul. 27, 2018

(65) Prior Publication Data

US 2020/0031473 A1    Jan. 30, 2020

(51) Int. Cl.
   *B64D 1/22*    (2006.01)
   *B64C 39/02*   (2006.01)
   *B64F 1/32*    (2006.01)

(52) U.S. Cl.
   CPC .............. *B64D 1/22* (2013.01); *B64C 39/024* (2013.01); *B64F 1/32* (2013.01);
   (Continued)

(58) Field of Classification Search
   CPC ............ B64C 2201/18; B64C 2201/20; B64C 2201/201; B64F 1/02; B64F 1/12;
   (Continued)

(56) References Cited

U.S. PATENT DOCUMENTS 8,205,820 B2 *  6/2012  Goossen ............... B64C 39/024
                                                244/2
9,139,310 B1    9/2015  Wang
(Continued)

FOREIGN PATENT DOCUMENTS

EP    2213570 A2    8/2010
ES    2673051       6/2018
(Continued)

OTHER PUBLICATIONS

Screenshots of video demonstrating Amazon delivery drone, Amazon Testing Drone Delivery System, www.youtube.com/watch?v=Le46ERPMlWU, published Dec. 1, 2013, screenshots captured on Jul. 26, 2018.

(Continued)

*Primary Examiner* — Richard R. Green
*Assistant Examiner* — Arfan Y. Sinaki
(74) *Attorney, Agent, or Firm* — Dascenzo Gates Intellectual Property Law, P.C.

(57) ABSTRACT

Vehicle docking systems, payload transfer systems, and related methods. A vehicle docking system includes a vehicle with a plurality of docking insert units and a docking platform with a plurality of docking receptor units. Each docking receptor unit is configured to transition between an unlocked configuration and a locked configuration. A method of utilizing a vehicle docking system includes bringing a vehicle to a docked position on a docking platform and securing the vehicle in the docked position. The docking platform includes a plurality of docking receptor units and the vehicle includes a plurality of docking insert units, each docking receptor unit configured to receive a corresponding docking insert unit. The securing the vehicle in the docked position includes transitioning each docking receptor unit from an unlocked configuration to a locked configuration. A payload transfer system includes a payload engagement system and a vehicle docking system.

20 Claims, 14 Drawing Sheets

(52) U.S. Cl.
CPC .. *B64C 2201/108* (2013.01); *B64C 2201/128* (2013.01); *B64C 2201/18* (2013.01)

(58) Field of Classification Search
CPC .. B64F 1/125; B64F 1/22; B64F 1/222; B64F 1/007; E01F 3/00; B64D 1/22
See application file for complete search history.

(56) References Cited

U.S. PATENT DOCUMENTS

| | | | | |
|---|---|---|---|---|
| 10,407,182 | B1* | 9/2019 | Alcorn | B64F 1/362 |
| 2016/0376031 | A1* | 12/2016 | Michalski | G08G 5/0026 |
| | | | | 701/15 |
| 2017/0217323 | A1* | 8/2017 | Antonini | B60L 53/30 |
| 2018/0072415 | A1* | 3/2018 | Cantrell | B64D 1/22 |
| 2018/0079531 | A1* | 3/2018 | Bennett | G05D 1/0011 |
| 2018/0086457 | A1* | 3/2018 | Burch, V | G06Q 10/08 |
| 2019/0217970 | A1* | 7/2019 | Chan | B64F 1/22 |
| 2019/0291865 | A1* | 9/2019 | O'Donnell | B65D 81/3818 |
| 2020/0317340 | A1* | 10/2020 | Gil | B64D 1/00 |

FOREIGN PATENT DOCUMENTS

| | | | |
|---|---|---|---|
| ES | 2673051 | A1 * | 6/2018 |
| WO | WO 2016019978 | | 2/2016 |

OTHER PUBLICATIONS

Screenshots of video demonstrating UPS delivery drone, UPS Residential Delivery via Drone, www.youtube.com/watch?v=CymJVPQE1dg, published Feb. 21, 2017, screenshots captured on Jul. 26, 2018.
European Patent Office, Partial European Search Report for related European Patent Application No. 19187376, dated Nov. 18, 2019.
Machine-generated English translation of the abstract of ES 2673051, downloaded from Espacenet.com Jan. 31, 2020.

* cited by examiner

VEHICLE DOCKING SYSTEMS, PAYLOAD TRANSFER SYSTEMS, AND RELATED METHODS

FIELD

The present disclosure relates to vehicle docking systems, payload transfer systems, and related methods.

BACKGROUND

Vehicles such as aircraft may be used to deliver payloads to a delivery site. For example, unmanned aerial vehicles (UAVs) may be used to transport payloads substantially autonomously. However, such applications generally require human interaction to place a package in the UAV's cargo area and/or to otherwise couple the payload to the UAV and/or uncouple the payload from the UAV. Such human interaction with a UAV may necessitate the use of special procedures and/or apparatuses to ensure the safety of the human user, and/or may result in a longer turnaround time to couple the payload to the UAV and/or uncouple the payload from the UAV, relative to an automated system.

SUMMARY

Vehicle docking systems, payload transfer systems, and related methods are disclosed herein. A vehicle docking system for selectively retaining a vehicle in a docked position relative to a docking platform includes a vehicle that includes landing gear having an associated plurality of docking insert units in a geometric arrangement and a docking platform that includes a plurality of docking receptor units. Each docking receptor unit is configured to selectively engage a corresponding docking insert unit of the plurality of docking insert units to selectively retain the vehicle in a docked position relative to the docking platform. The plurality of docking receptor units has a geometric arrangement corresponding to the geometric arrangement of the plurality of docking insert units. When the vehicle is in the docked position, each docking insert unit is received in a corresponding docking receptor unit to maintain the vehicle in the docked position. Each docking receptor unit is configured to transition between an unlocked configuration, in which the corresponding docking insert unit is free to be inserted into and removed from the docking receptor unit, and a locked configuration, in which the corresponding docking insert unit is restricted from being removed from the docking receptor unit when the vehicle is in the docked position.

A method of utilizing a vehicle docking system to selectively retain a vehicle in a docked position relative to a docking platform includes bringing the vehicle to the docked position relative to the docking platform and securing the vehicle in the docked position. The docking platform includes a plurality of docking receptor units having a geometric arrangement, and the vehicle includes a plurality of docking insert units having a geometric arrangement corresponding to the geometric arrangement of the plurality of docking insert units. When the vehicle is in the docked position, each docking insert unit of the plurality of docking insert units is received in a corresponding docking receptor unit of the plurality of docking receptor units to maintain the vehicle in the docked position. The securing the vehicle in the docked position includes transitioning each docking receptor unit from an unlocked configuration, in which the corresponding docking insert unit is free to be inserted into and removed from the docking receptor unit, to a locked configuration, in which the corresponding docking insert unit is restricted from being removed from the docking receptor unit when the vehicle is in the docked position.

A payload transfer system for transferring a payload to a vehicle includes a vehicle that includes at least one engagement latch and landing gear having an associated plurality of docking insert units in a geometric arrangement, a payload that includes at least one engagement receptor, a docking platform configured to selectively maintain the vehicle in a docked position relative to the docking platform and including a plurality of docking receptor units, a vehicle docking system for selectively retaining the vehicle in the docked position relative to the docking platform, and a payload engagement system for selectively coupling the payload to the vehicle. The vehicle docking system includes the plurality of docking insert units and the plurality of docking receptor units. Each docking receptor unit is configured to selectively engage a corresponding docking insert unit of the plurality of docking insert units to selectively retain the vehicle in the docked position relative to the docking platform. The plurality of docking receptor units has a geometric arrangement corresponding to the geometric arrangement of the plurality of docking insert units. When the vehicle is in the docked position, each docking insert unit is received in a corresponding docking receptor unit to maintain the vehicle in the docked position. Each docking receptor unit is configured to transition between an unlocked configuration, in which the corresponding docking insert unit is free to be inserted into and removed from the docking receptor unit, and a locked configuration, in which the corresponding docking insert unit is restricted from being removed from the docking receptor unit when the vehicle is in the docked position. The payload engagement system includes the at least one engagement latch and the at least one engagement receptor. Each engagement latch is configured to selectively engage a corresponding engagement receptor of the at least one engagement receptor to selectively couple the payload to the vehicle. Each engagement latch is configured to be selectively transitioned between an engaged configuration, in which each engagement latch engages the corresponding engagement receptor to couple the payload to the vehicle, and a disengaged configuration, in which each engagement latch is removed from each engagement receptor. The payload engagement system is configured to guide the payload to a predetermined coupling position relative to the vehicle to establish alignment of each engagement latch relative to the corresponding engagement receptor in an alignment plane prior to each engagement latch transitioning from the disengaged configuration to the engaged configuration. Each engagement latch is configured to translate in a lateral direction that is at least substantially parallel to the alignment plane as the engagement latch transitions between the engaged configuration and the disengaged configuration.

DESCRIPTION

Figure 1:
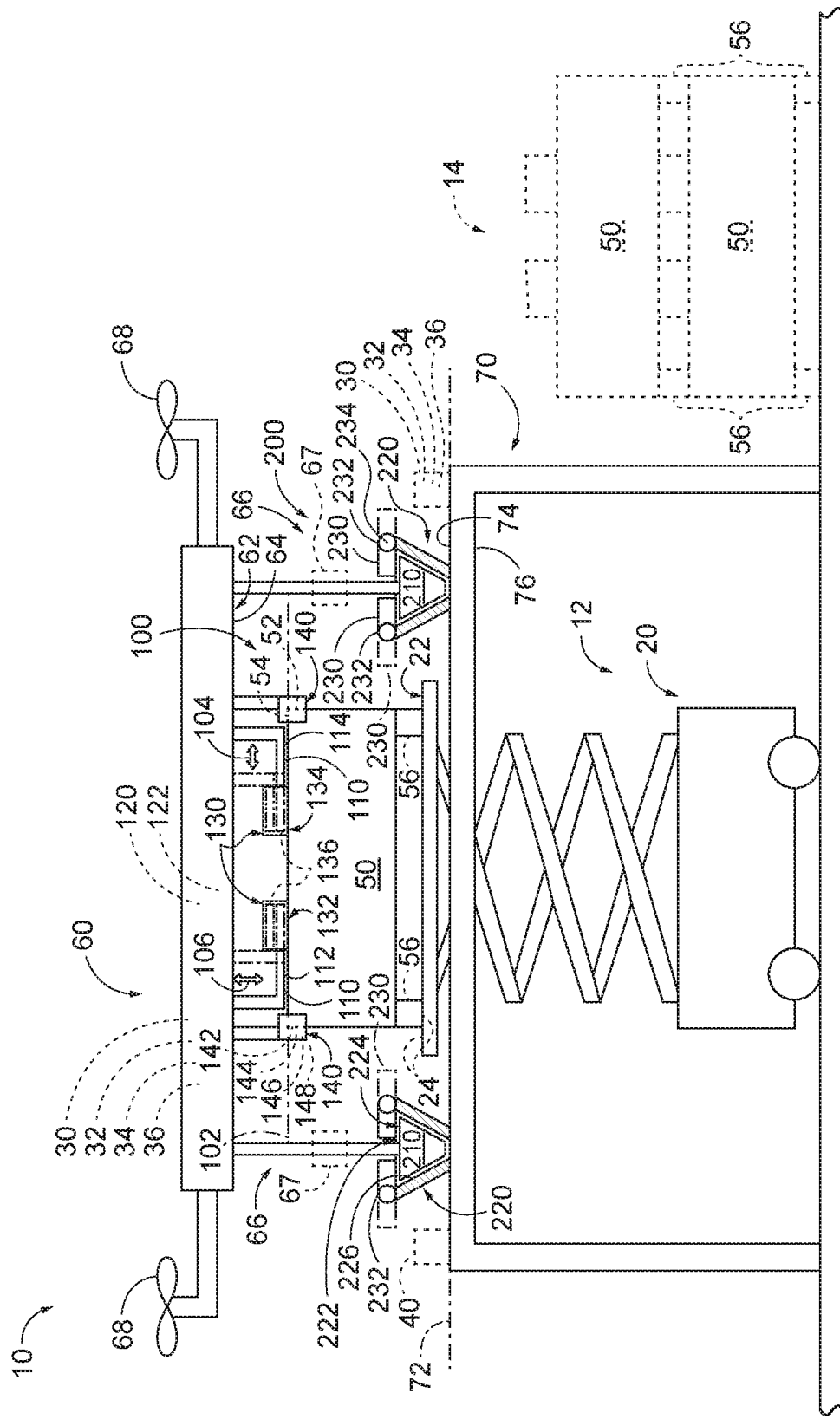
FIG. 1 is a schematic side elevation view representing examples of payload transfer systems according to the present disclosure.

FIGS. 1-18 provide illustrative, non-exclusive examples of payload transfer systems 10 including payload engagement system 100 and/or vehicle docking system 200, of payloads 50 including portions of payload engagement system 100, of vehicles 60 including portions of payload engagement systems 100 and/or of vehicle docking systems 200, of docking platforms 70 including portions of vehicle docking system 200, of methods 300 of utilizing payload engagement systems, and/or of methods 400 of utilizing vehicle docking systems, according to the present disclosure. Elements that serve a similar, or at least substantially similar, purpose are labeled with like numbers in each of FIGS. 1-18, and these elements may not be discussed in detail herein with reference to each of FIGS. 1-18. Similarly, all elements may not be labeled in each of FIGS. 1-18, but reference numerals associated therewith may be utilized herein for consistency. Elements, components, and/or features that are discussed herein with reference to one or more of FIGS. 1-18 may be included in and/or utilized with any of FIGS. 1-18 without departing from the scope of the present disclosure. Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

FIG. 1 is a schematic illustration of examples of payload transfer systems 10, while FIGS. 2-8 are schematic illustrations of an example of payload transfer system 10. Specifically, and as discussed in more detail herein, FIGS. 2-8 depict examples of utilizing payload transfer system 10, payload engagement system 100, and/or vehicle docking system 200. As schematically illustrated in FIGS. 1-8, a payload transfer system 10 includes a payload engagement system 100 configured to selectively couple a payload 50 to a vehicle 60 and a vehicle docking system 200 configured to selectively retain vehicle 60 in a docked position relative to a docking platform 70. While FIGS. 1-8 schematically illustrate examples of payload transfer system 10 that include payload engagement system 100 and vehicle docking system 200, it is within the scope of the present disclosure that payload engagement system 100 may be utilized independent of vehicle docking system 200 and/or payload transfer system 10 and that vehicle docking system 200 may be utilized independent of payload engagement system 100 and/or payload transfer system 10. Additionally, any reference to a component of payload transfer system 10 additionally or alternatively may be understood as referring to a corresponding component of payload engagement system 100 and/or of vehicle docking system 200. As an example, as used herein, a reference to vehicle 60 of payload transfer system 10 additionally or alternatively may be understood as referring to vehicle 60 of payload engagement system 100 and/or vehicle 60 of vehicle docking system 200. Stated differently, as an example, vehicle 60 may refer to vehicle 60 of payload transfer system 10, vehicle 60 of payload engagement system 100, and/or vehicle 60 of vehicle docking system 200, as appropriate. Similarly, as used herein, any reference to payload transfer system 10 may be understood as referring to any appropriate component of payload engagement system 100 and/or of vehicle docking system 200, even in an example that does not include each of payload engagement system 100 and vehicle docking system 200.

As schematically illustrated in FIGS. 1-8, payload engagement system 100 includes payload 50 and vehicle 60. Vehicle 60 of payload engagement system 100 includes at least one engagement latch 110, and payload 50 includes at least one engagement receptor 130, such that each engagement latch 110 is configured to selectively engage a corresponding engagement receptor 130 to selectively couple payload 50 to vehicle 60. More specifically, each engagement latch 110 is configured to be selectively transitioned between an engaged configuration (schematically illustrated in dash-dot lines in FIG. 1), in which engagement latch 110 engages the corresponding engagement receptor 130 to couple payload 50 to vehicle 60, and a disengaged configuration (schematically illustrated in solid lines in FIG. 1), in which engagement latch 110 is removed from each engagement receptor 130.

As used herein, each engagement latch 110 may be described as engaging the corresponding engagement receptor 130, and/or may be described as being in the engaged configuration, even when engagement latch 110 does not directly contact the corresponding engagement receptor 130. That is, payload 50 may be described as being selectively coupled to vehicle 60 when each engagement latch 110 is in the engaged configuration regardless of whether each engagement latch 110 directly contacts the corresponding engagement receptor 130 at all times while in the engaged configuration. Stated differently, each engagement latch 110 may be spaced apart from the corresponding engagement receptor 130 and/or may not contact the corresponding engagement receptor 130 when engagement latch 110 is in the engaged configuration. Stated another way, payload 50 may be restricted from being removed from vehicle 60 when each engagement latch 110 is in the engaged configuration, even in an example in which each engagement latch 110 is spaced apart from the corresponding engagement receptor 130 when in the engaged configuration. Payload 50 may include and/or be any appropriate structure. As an example, and as schematically illustrated in FIGS. 1-8, payload 50 may include a plurality of stacking legs 56 disposed on an underside of payload 50 and configured to facilitate stacking payload 50 on top of an identical payload 50. Such a stacking arrangement is schematically illustrated in dashed lines in FIG. 1. Additionally or alternatively, payload 50 may include and/or be a payload container, such as a reusable payload container that is configured to selectively and repeatedly contain a separate object. As schematically illustrated in FIGS. 1-8, payload 50 may be at least substantially in the shape of a rectangular prism. However, this is not required to all examples of payload 50, and it is additionally within the scope of the present disclosure that payload 50 may have any appropriate overall shape. Payload transfer systems 10 according to the present disclosure may be utilized in conjunction with payloads 50 of any appropriate size and/or mass. As examples, payload 50 may have a volume that is at least 10 liters (L), at least 50 L, at least 100 L, at least 500 L, at least 1,000 L, at least 5,000 L, at least 10,000 L, at least 50,000 L, at most 100,000 L, at most 70,000 L, at most 20,000 L, at most 7,000 L, at most 2,000 L, at most 700 L, at most 200 L, at most 70 L, and/or at most 20 L. Additionally or alternatively, payload 50 may have a mass that is at least 1 kilogram (kg), at least 5 kg, at least 10 kg, at least 50 kg, at least 100 kg, at least 500 kg, at least 1,000 kg, at most 1,500 kg, at most 700 kg, at most 200 kg, at most 70 kg, at most 20 kg, at most 7 kg, and/or at most 2 kg.

As schematically illustrated in FIG. 1, vehicle 60 may include and/or be an aircraft. In such an embodiment, and as discussed herein, vehicle 60 may have landing gear 66, such as may be configured to support vehicle 60 upon docking platform 70 and/or upon a ground surface. Additionally, and as schematically illustrated in FIG. 1, landing gear 66 may include at least one shock absorber 67 configured to resiliently contract when vehicle 60 engages docking platform 70 and/or the ground surface. As further schematically illustrated in FIG. 1, vehicle 60 may include at least one thrust generator 68 configured to propel vehicle 60 away from docking platform 70. As a more specific example, in an embodiment in which vehicle 60 is an aircraft, each thrust generator 68 may be a rotor and/or a propeller. While the specific examples and embodiments discussed herein generally relate to examples in which vehicle 60 is an aircraft, this is not required to all payload transfer systems 10 according to the present disclosure, and it is additionally within the scope of the present disclosure that vehicle 60 may include and/or be any appropriate vehicle for carrying a payload, such as a land-based vehicle, a water vehicle, a submersible water vehicle, and/or a space vehicle.

In an embodiment of payload transfer system 10 in which vehicle 60 includes and/or is an aircraft, vehicle 60 may include and/or be any appropriate aircraft. As examples, vehicle 60 may include and/or be a rotorcraft, such as a rotorcraft that includes two rotors, three rotors, four rotors, or more than four rotors. Additionally or alternatively, vehicle 60 may include and/or be an unmanned aerial vehicle (UAV) and/or a drone. As more specific examples, vehicle 60 may be a remotely piloted UAV or may be an autonomously controlled UAV. Utilizing payload engagement system 100 in conjunction with vehicle 60 in the form of a UAV may facilitate transporting payload 50, such as a package, with little or no human intervention needed to couple payload 50 to vehicle 60 or to uncouple payload 50 from vehicle 60, thereby increasing a delivery turnaround speed relative to a system in which coupling payload 50 to vehicle 60 requires human intervention.

As described in more detail herein, and as schematically illustrated in FIG. 1, payload engagement system 100 includes an alignment guide 140 configured to guide payload 50 to a predetermined coupling position relative to vehicle 60 to establish alignment of each engagement latch 110 and each corresponding engagement receptor 130. Specifically, and as schematically illustrated in FIG. 1, when payload 50 is in the coupling position, each engagement latch 110 is aligned relative to each corresponding engagement receptor 130 in an alignment plane 102, and payload engagement system 100 is configured to establish alignment of each engagement latch 110 relative to each corresponding engagement receptor 130 in alignment plane 102 prior to each engagement latch 110 transitioning from the disengaged configuration to the engaged configuration. As schematically illustrated in FIG. 1, each engagement latch 110 is configured to translate in a lateral direction 104 that is at least substantially parallel to alignment plane 102 as engagement latch 110 transitions between the engaged configuration and the disengaged configuration. As used herein, a reference to each of a plurality of engagement latches 110 moving and/or translating in lateral direction 104 does not require that each engagement latch 110 moves and/or translates in an identical direction. Stated differently, as used herein, lateral direction 104 may not refer to a single direction, and instead may refer to any direction that is at least substantially parallel to alignment plane 102. Accordingly, in an example in which two distinct engagement latches 110 each are translating in a direction parallel to alignment plane 102 and are translating toward one another, each engagement latch 110 still may be described as translating in lateral direction 104.

As schematically illustrated in FIG. 1, each engagement latch 110 may be positioned on an underside 62 of vehicle 60, such that alignment plane 102 is at least substantially parallel to an undersurface 64 of vehicle 60. However, this is not required to all examples of payload engagement system 100, and it is additionally within the scope of the present disclosure that each engagement latch 110 and/or alignment plane 102 may have any appropriate spatial relationship to vehicle 60 and/or components thereof.

As used herein, positional terms such as "above," "below," "under," "underside," and the like may be used to describe spatial relationships between components of payload transfer systems 10, of payload engagement systems 100, and/or of vehicle docking systems 200 in an illustrative, non-limiting manner, and generally refer to a configuration in which landing gear 66 of vehicle 60 faces a ground surface and/or in which alignment plane 102 is parallel to a ground surface. Such terms are provided as context only and do not limit component parts of payload transfer systems 10, of payload engagement systems 100, and/or of vehicle docking systems 200 to always be in a specific orientation relative to ground.

Each engagement receptor 130 may be fixedly mounted to payload 50, and each engagement latch 110 may be configured to translate with respect to the corresponding engagement receptor 130 as engagement latch 110 transitions between the engaged configuration and the disengaged configuration. While the examples discussed herein describe examples of payload engagement system 100 in which payload 50 includes each engagement receptor 130 and vehicle 60 includes each engagement latch 110, this is not required to all examples of payload engagement system 100, and it is additionally within the scope of the present disclosure that payload 50 may include each engagement latch 110 and vehicle 60 may include each engagement receptor 130.

Payload engagement system 100 may include any appropriate number of engagement latches 110 and/or of engagement receptors 130. As examples, the at least one engagement latch 110 may include one engagement latch 110, two engagement latches 110, three engagement latches 110, four engagement latches 110, or more than four engagement latches 110. Similarly, the at least one engagement receptor 130 may include one engagement receptor 130, two engagement receptors 130, three engagement receptors 130, four engagement receptors 130, or more than four engagement receptors 130.

As a more specific example, and as schematically illustrated in FIG. 1, payload engagement system 100 may include a first engagement receptor 132 and a second engagement receptor 134 such that first engagement receptor 132 and second engagement receptor 134 are positioned in a spaced-apart arrangement on payload 50. In such an example, payload engagement system 100 further may include a first engagement latch 112 configured to engage first engagement receptor 132 and a second engagement latch 114 configured to engage second engagement receptor 134. In such an example, and as schematically illustrated in FIG. 1, first engagement latch 112 and second engagement latch 114 may be spaced apart from each other such that first engagement latch 112 engages first engagement receptor 132 and second engagement latch 114 engages second engagement receptor 134 when each engagement latch 110 is in the engaged configuration. As further schematically illustrated in FIG. 1, first engagement latch 112 and second engagement latch 114 may be configured to translate toward each other while each engagement latch 110 transitions from the disengaged configuration to the engaged configuration.

As illustrated in FIGS. 1-8 and 11, the number of engagement latches 110 may equal the number of engagement receptors 130. However, this is not required to all examples of payload engagement system 100, and it is additionally within the scope of the present disclosure that the number of engagement latches 110 may be greater than or less than the number of engagement receptors 130.

Each engagement receptor 130 may be configured to receive the corresponding engagement latch 110 in any appropriate manner. For example, and as schematically illustrated in FIGS. 1-8, each engagement receptor 130 may include a latch receiver 136 such that each engagement latch 110 is at least partially received within latch receiver 136 of the corresponding engagement receptor 130 when engagement latch 110 is in the engaged configuration.

While FIGS. 1-8 generally depict each engagement latch 110 as being substantially enclosed within each corresponding engagement receptor 130 when each engagement latch 110 is in the engaged configuration, this is not required to all examples of payload engagement system 100, and it is additionally within the scope of the present disclosure that each engagement latch 110 and/or each engagement receptor 130 may have any appropriate respective shapes. As an example, while FIGS. 1-8 generally schematically illustrate each engagement latch 110 as being generally "L"-shaped and each engagement receptor 130 as being generally "U"-shaped, it is additionally within the scope of the present disclosure that each engagement latch 110 may be generally "U"-shaped and/or that each engagement receptor 130 may be generally "L"-shaped. Stated differently, as used herein, the term "latch" generally describes a structure (such as engagement latch 110) that translates with respect to a substantially stationary receptor unit (such as engagement receptor 130) to selectively engage the receptor unit.

As schematically illustrated in FIG. 1, payload engagement system 100 further may be configured to transition each engagement latch 110 between the engaged configuration and a secured configuration (illustrated in dash-dot-dot lines in FIG. 1) when engagement latch 110 is engaged with the corresponding engagement receptor 130. Specifically, each engagement latch 110 may be configured to translate in a transverse direction 106 that is at least substantially perpendicular to alignment plane 102 as engagement latch 110 is transitioned between the engaged configuration and the secured configuration. Payload 50 may be restricted from moving relative to vehicle 60 when vehicle 60 carries payload 50 and when each engagement latch 110 is in the secured configuration. For example, and as discussed herein, payload 50 may be positively retained against a portion of vehicle 60 and/or payload engagement system 100 by each engagement latch 110 when each engagement latch 110 is in the secured configuration.

Each engagement latch 110 may be configured to transition between the disengaged configuration, the engaged configuration, and the secured configuration in any appropriate manner. As an example, and as schematically illustrated in FIGS. 1-8, payload engagement system 100 and/or vehicle 60 may include a latch actuator 120 configured to translate each engagement latch 110 in lateral direction 104 to translate each engagement latch 110 between the engaged configuration and the disengaged configuration. Latch actuator 120 further may be configured to translate each engagement latch 110 in transverse direction 106 to transition each engagement latch 110 between the engaged configuration and the secured configuration. In such an embodiment, latch actuator 120 may be configured to sequentially (1) translate each engagement latch 110 along lateral direction 104 and (2) translate each engagement latch 110 along transverse direction 106. Stated differently, latch actuator 120 may be configured to translate each engagement latch 110 from the disengaged configuration to the engaged configuration and from the engaged configuration to the secured configuration in separate sequential steps. Alternatively, latch actuator 120 may be configured to translate each engagement latch 110 along lateral direction 104 and transverse direction 106 at least partially concurrently.

Latch actuator 120 may be configured to translate each engagement latch 110 in any appropriate manner. As an example, and as schematically illustrated in FIGS. 1-8, latch actuator 120 may include at least one latch actuator motor 122 such that each latch actuator motor 122 is configured to translate at least one corresponding engagement latch 110 along lateral direction 104 and/or along transverse direction 106. As a more specific example, each latch actuator motor 122 may be configured to translate a single corresponding engagement latch 110. Alternatively, each latch actuator motor 122 may be configured to translate each of a corresponding plurality of engagement latches 110. Additionally or alternatively, each latch actuator motor 122 may be configured to translate each corresponding engagement latch 110 along either lateral direction 104 or transverse direction 106. Alternatively, each latch actuator motor 122 may be configured to translate each corresponding engagement latch 110 along each of lateral direction 104 and transverse direction 106.

Latch actuator 120 and/or latch actuator motor 122 may be configured to operate in any appropriate manner. As an example, and as schematically illustrated in FIG. 1, payload engagement system 100 additionally may include an alignment sensor 32 configured to detect when payload 50 is in the coupling position. In such an example, latch actuator 120 may be configured to transition each engagement latch 110 from the disengaged configuration to the engaged configuration responsive to alignment sensor 32 detecting payload 50 in the coupling position. However, this is not required to all examples of payload engagement system 100, and it is additionally within the scope of the present disclosure that latch actuator 120 and/or latch actuator motor 122 may be operated manually and/or responsive to a user input.

As discussed, payload engagement system 100 generally is configured to guide payload 50 to the coupling position prior to transitioning each engagement latch 110 from the disengaged configuration to the engaged configuration. As an example, and as schematically illustrated in FIGS. 1-8, alignment guide 140 of payload engagement system 100 may be disposed on a lower side of vehicle 60 and may be configured to guide and establish alignment of payload 50 and vehicle 60 to establish alignment of each engagement latch 110 relative to each corresponding engagement receptor 130. Stated differently, alignment guide 140 may be configured to guide payload 50 to the coupling position relative to vehicle 60.

Alignment guide 140 may have any appropriate structure for guiding payload 50 to the coupling position. For example, and as discussed in more detail herein in the context of FIGS. 9-10, alignment guide 140 may include a ramped portion 146 configured to engage at least a portion of payload 50 to passively guide payload 50 to the coupling position when each engagement receptor 130 approaches the corresponding engagement latch 110 along transverse direction 106. Ramped portion 146 may include and/or be a surface that is angled with respect to lateral direction 104 and/or transverse direction 106. In this manner, ramped portion 146 may urge payload 50 in a direction at least substantially parallel to alignment plane 102 and/or lateral direction 104 when payload 50 is driven toward ramped portion 146 along transverse direction 106 and/or when each engagement receptor 130 approaches the corresponding engagement latch 110 along transverse direction 106.

Alignment guide 140 and/or ramped portion 146 may engage payload 50 in any appropriate manner. For example, and as schematically illustrated in FIG. 1, payload 50 may include a plurality of corners 52, and alignment guide 140 may include a plurality of corner units 142 such that each corner unit 142 is configured to receive a corresponding corner 52 as payload 50 approaches the coupling position. In such an embodiment, at least one corner unit 142 may include ramped portion 146. Additionally or alternatively, and as further schematically illustrated in FIG. 1, payload 50 may include a plurality of edges 54, and alignment guide 140 may include a plurality of alignment rails 144, each alignment rail configured to engage a corresponding edge 54 of payload 50 as payload 50 approaches the coupling position. In such an embodiment, at least one alignment rail 144 may include ramped portion 146. In an embodiment of payload engagement system 100 in which alignment guide 140 includes a plurality of corner units 142 and a plurality of alignment rails 144, each alignment rail 144 may extend between a corresponding pair of corner units 142. Additionally or alternatively, and as further schematically illustrated in FIG. 1, alignment guide 140 may include at least one payload stop 148 configured to engage payload 50 when payload 50 is in the coupling position, such as to limit an extent to which payload 50 may be translated toward vehicle 60 along transverse direction 106. In such an embodiment, each engagement latch 110 may be configured to positively retain payload 50 against each payload stop 148 when payload 50 is in the coupling position and when each engagement latch 110 is in the secured configuration.

FIGS. 1-8 additionally schematically illustrate components and/or operation of vehicle docking system 200 of payload transfer system 10. As schematically illustrated in FIGS. 1-8, vehicle docking system 200 includes vehicle 60 that includes landing gear 66 and docking platform 70. Landing gear 66 includes and/or is otherwise associated with a plurality of docking insert units 210 in a geometric arrangement, and docking platform 70 includes a plurality of docking receptor units 220, such that each docking receptor unit 220 is configured to selectively engage a corresponding docking insert unit 210 to selectively retain vehicle 60 in a docked position relative to docking platform 70. More specifically, the plurality of docking receptor units 220 has a geometric arrangement corresponding to the geometric arrangement of the plurality of docking insert units 210, such that each docking insert unit 210 is received in a corresponding docking receptor unit 220 to maintain vehicle 60 in the docked position. As discussed in more detail herein, each docking receptor unit 220 is configured to transition between an unlocked configuration (illustrated in dash-dot lines in FIG. 1) and a locked configuration (illustrated in solid lines in FIG. 1). Specifically, when each docking receptor unit 220 is in the unlocked configuration, the corresponding docking insert unit 210 is free to be inserted into and removed from docking receptor unit 220. Conversely, when vehicle 60 is in the docked position and when each docking receptor unit 220 is in the locked configuration, the corresponding docking insert unit 210 is restricted from being removed from docking receptor unit 220.

While the examples discussed herein describe examples of vehicle docking system 200 in which vehicle 60 includes each docking insert unit 210 and docking platform 70 includes each docking receptor unit 220, this is not required to all examples of vehicle docking system 200, and it is additionally within the scope of the present disclosure that vehicle 60 may include each docking receptor unit 220 and docking platform 70 may include each docking insert unit 210.

Each docking receptor unit 220 may be configured to transition between the locked configuration and the unlocked configuration in any appropriate manner. For example, and as schematically illustrated in FIGS. 1-8, vehicle docking system 200 may include at least one insert retainer 230 associated with a corresponding docking receptor unit 220 and configured to selectively restrict a corresponding docking insert unit 210 from being removed from the corresponding docking receptor unit 220 when vehicle 60 is in the docked position and when docking receptor unit 220 is in the locked configuration. More specifically, each insert retainer 230 may be configured to mechanically restrict the corresponding docking insert unit 210 from being removed from docking receptor unit 220.

Vehicle docking system 200 may include any appropriate number of docking insert units 210 and/or of docking receptor units 220. As examples, the plurality of docking insert units 210 may include two docking insert units 210, three docking insert units 210, four docking insert units 210, or more than four docking insert units 210. Similarly, the plurality of docking receptor units 220 may include two docking receptor units 220, three docking receptor units 220, four docking receptor units 220, or more than four docking receptor units 220. As illustrated in FIGS. 1-8 and 12-16, the number of docking insert units 210 may equal the number of docking receptor units 220. However, this is not required to all examples of vehicle docking system 200, and it is additionally within the scope of the present disclosure that the number of docking insert units 210 may be greater than or less than the number of docking receptor units 220.

Figure 2:
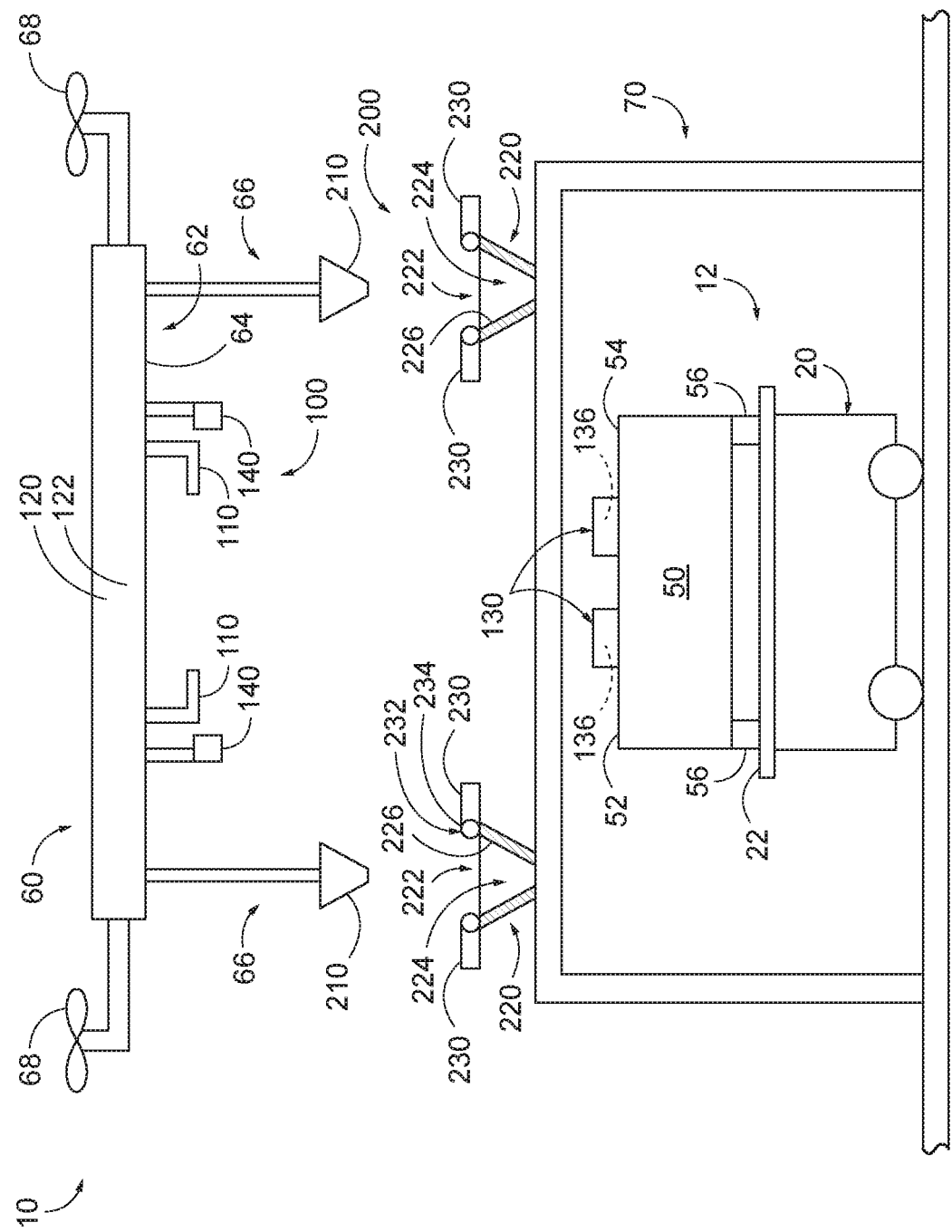
FIG. 2 is a schematic side elevation view representing an example of a payload transfer system with a vehicle approaching a docking platform to receive a payload according to the present disclosure.
Figure 3:
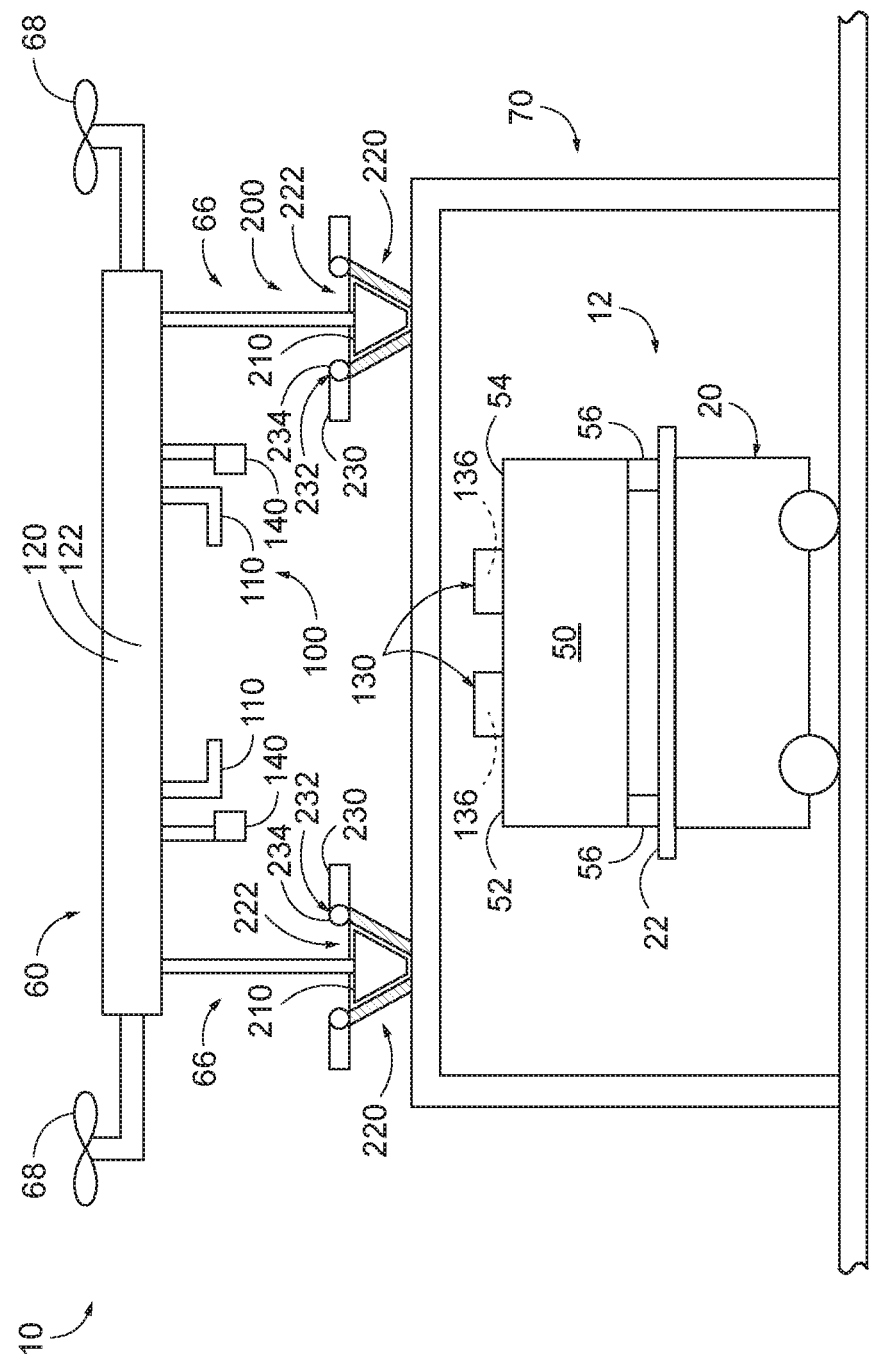
FIG. 3 is a schematic side elevation view representing the payload transfer system of FIG. 2 with the vehicle at a docked position relative to the docking platform and with a plurality of docking receptor units in an unlocked configuration according to the present disclosure.
Figure 6:
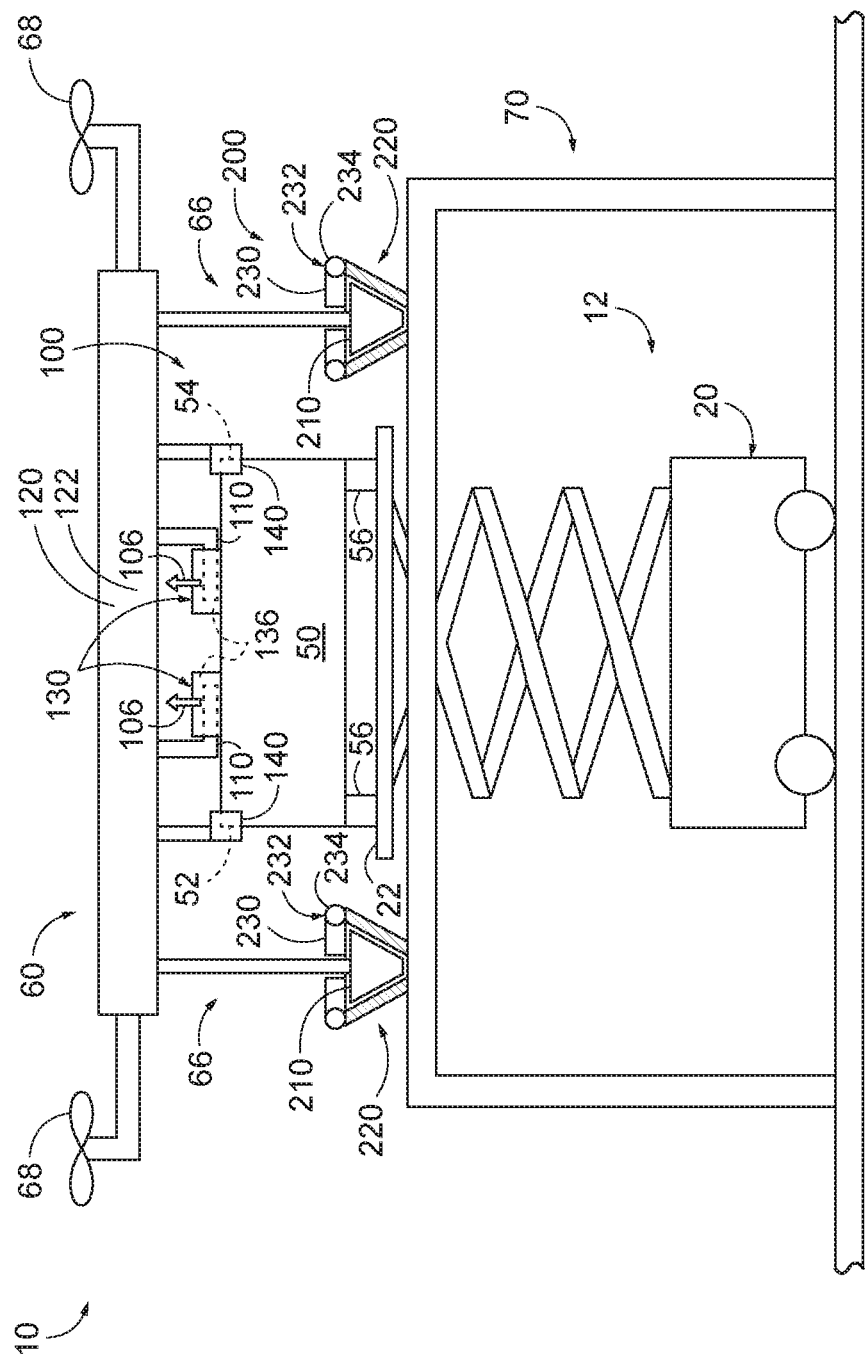
FIG. 6 is a schematic side elevation view representing the payload transfer system of FIGS. 2-5 with the payload in the coupling position and with the plurality of engagement latches in an engaged configuration according to the present disclosure.
Figure 7:
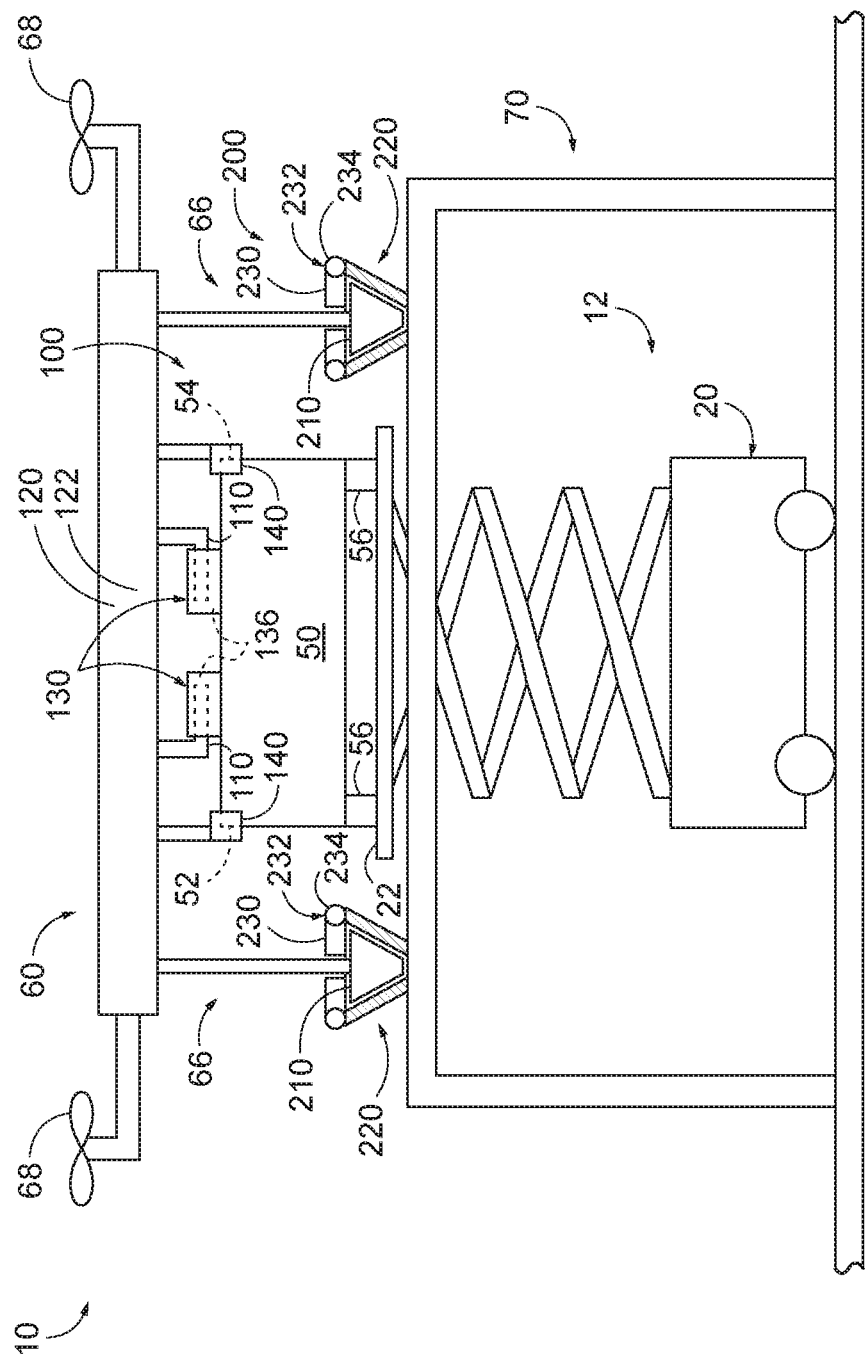
FIG. 7 is a schematic side elevation view representing the payload transfer system of FIGS. 2-6 with the payload in the coupling position and with the plurality of engagement latches in a secured configuration according to the present disclosure.
Figure 8:
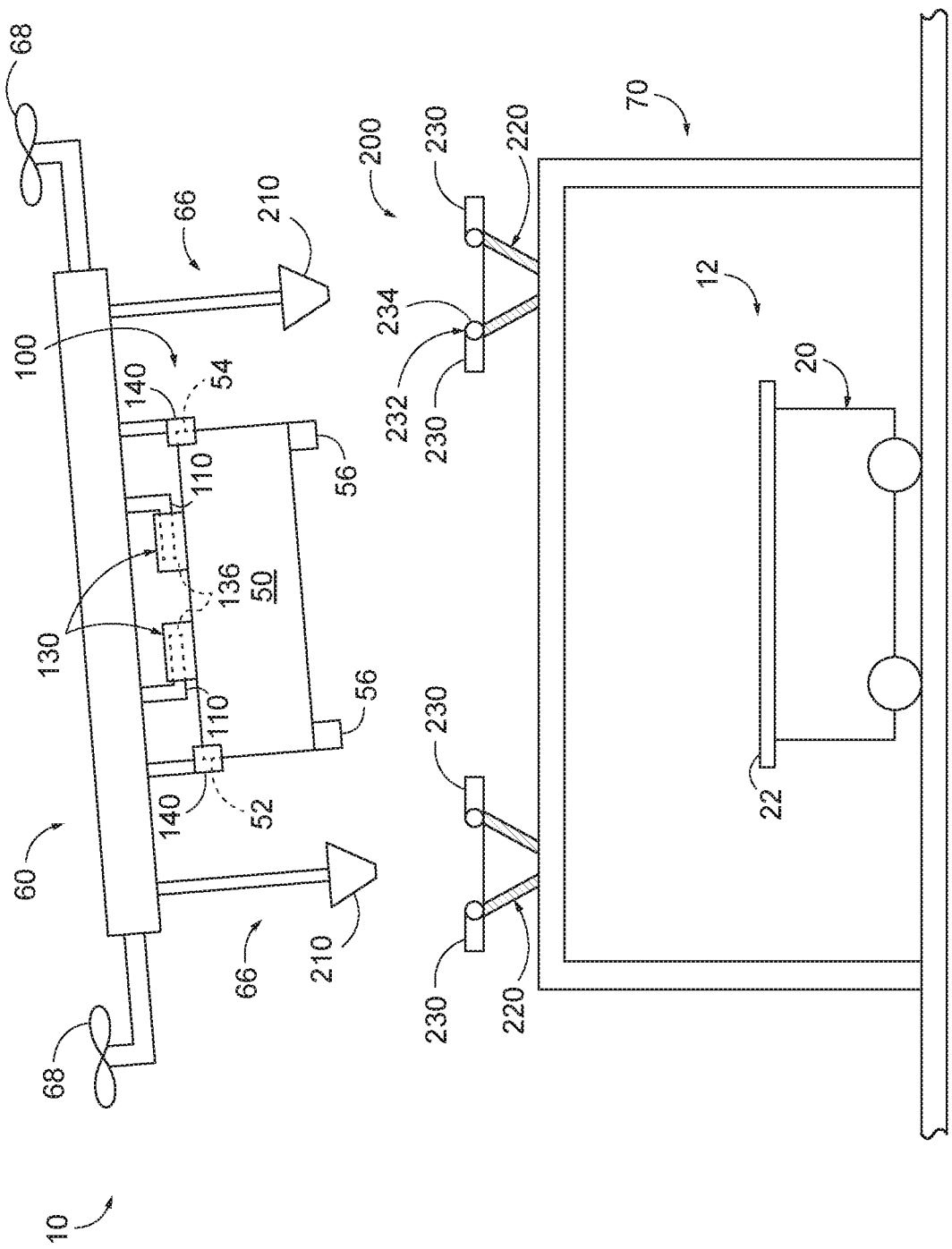
FIG. 8 is a schematic side elevation view representing the payload transfer system of FIGS. 2-7 with the vehicle carrying the payload away from the docking platform according to the present disclosure.

Each docking receptor unit 220 may have any appropriate structure for receiving and/or retaining the corresponding docking insert unit 210. For example, and as schematically illustrated in FIGS. 1-3, each docking receptor unit 220 may include a receptor opening 222 such that docking receptor unit 220 is configured to receive the corresponding docking insert unit 210 via receptor opening 222. In such a configuration, insert retainer 230 may at least substantially cover receptor opening 222 when docking receptor unit 220 is in the locked configuration. Such operation is schematically illustrated in FIG. 1, in which each insert retainer 230 covers the corresponding receptor opening 222 when the corresponding docking receptor unit 220 is in the locked configuration (solid lines) and is spaced apart from the corresponding receptor opening 222 when the corresponding docking receptor unit 220 is in the unlocked configuration (dash-dot lines). Such operation is further illustrated in FIGS. 2-8, of which FIGS. 2-3 and 8 illustrate each docking receptor unit 220 in the unlocked configuration, while FIGS. 4-7 illustrates each docking receptor unit 220 in the locked configuration.

As additionally schematically illustrated in FIGS. 1-2, each docking receptor unit 220 may include an insert receiver 224 configured to receive and guide a corresponding docking insert unit 210 into alignment with docking receptor unit 220 while vehicle 60 approaches the docked position. More specifically, insert receiver 224 may receive the corresponding docking insert unit 210 such that the corresponding docking insert unit 210 is at least substantially, and optionally fully, enclosed by insert receiver 224 of the corresponding docking receptor unit 220 when vehicle 60 is in the docked position. Insert receiver 224 may have any appropriate shape and/or structure for receiving and guiding the corresponding docking insert unit 210. As examples, each docking receptor unit 220 and/or insert receiver 224 thereof may be at least substantially conical, optionally fully conical, and optionally frusto-conical. Similarly, each docking insert unit 210 may be at least substantially conical, optionally fully conical, and optionally frusto-conical. Additionally or alternatively, and as schematically illustrated in FIGS. 1-2, insert receiver 224 may include a sloped portion 226 configured to engage the corresponding docking insert unit 210 to passively guide docking insert unit 210 into docking receptor unit 220. Stated differently, insert receiver 224 and/or sloped portion 226 thereof may be configured to engage the corresponding docking insert unit 210 in such a manner that docking insert 210 is urged toward a center of insert receiver 224 and such that vehicle 60 is urged toward the docked position. However, this is not required to all examples of vehicle docking system 200, and it is additionally within the scope of the present disclosure that each docking insert unit 210 may be guided into alignment with the corresponding docking receptor unit 220 in any appropriate manner. As examples, each docking insert unit 210 may be guided into alignment with the corresponding docking receptor unit 220 at least partially via active control and/or via a magnetic force. In an embodiment in which each of docking insert unit 210 and insert receiver 224 is at least substantially conical, docking insert unit 210 also may be referred to as a docking probe, and/or docking insert receiver 224 also may be referred to as a docking drogue.

Each docking receptor unit 220 may be configured to transition between the unlocked configuration and the locked configuration in any appropriate manner. As an example, and as schematically illustrated in FIGS. 1-8, vehicle docking system 200 and/or docking receptor unit 220 may include a retainer actuator 232 configured to transition at least one docking receptor unit 220 between the unlocked configuration and the locked configuration. As a more specific example, each insert retainer 230 may be hingedly coupled to the corresponding docking receptor unit 220, and retainer actuator 232 may be configured to pivot each insert retainer 230 relative to the corresponding docking receptor unit 220 to transition the corresponding docking receptor unit 220 between the unlocked configuration and the locked configuration.

Vehicle docking system 200, insert retainer 230, and/or retainer actuator 232 may be configured to transition each docking receptor unit 220 between the unlocked configuration and the locked configuration in any appropriate manner. As an example, and as schematically illustrated in FIGS. 1-8, retainer actuator 232 may include at least one retainer actuator motor 234 such that each retainer actuator motor 234 is configured to actuate at least one corresponding insert retainer 230 to transition at least one corresponding docking receptor unit 220 between the unlocked configuration and the locked configuration. In such an example, each retainer actuator motor 234 may be configured to actuate a single corresponding insert retainer 230, or may be configured to actuate each of a corresponding plurality of insert retainers 230.

Retainer actuator 232 and/or retainer actuator motor 234 may be configured to operate in any appropriate manner. As an example, and as schematically illustrated in FIG. 1, vehicle docking system 200 additionally may include a position sensor 34 configured to detect when vehicle 60 is in the docked position. In such an example, retainer actuator 232 may be configured to pivot and/or otherwise actuate each insert retainer 230 responsive to position sensor 34 detecting vehicle 60 in the docked position. However, this is not required to all examples of vehicle docking system 200, and it is additionally within the scope of the present disclosure that retainer actuator 232 and/or retainer actuator motor 234 may be operated manually and/or responsive to a user input.

While the foregoing discussion provides a broad overview of operative components of payload engagement systems 100 and/or vehicle docking systems 200 of payload transfer systems 10 according to the present disclosure, it is additionally within the scope of the present disclosure that payload transfer system 10 include and/or utilize any appropriate additional components to facilitate the operation of payload engagement system 100 and/or of vehicle docking system 200. As an example, and as schematically illustrated in FIGS. 1-8, payload transfer system 10 additionally may include a loader 20 configured to transfer payload 50 to vehicle 60. Loader 20 may have any appropriate positional relationship with respect to vehicle 60 when loader 20 transfers payload 50 to vehicle 60. As an example, and as schematically illustrated in FIG. 1, docking platform 70 may define a docking platform plane 72 that separates a first side 74 and a second side 76 of docking platform 70. In such an embodiment, vehicle 60 may be positioned at least substantially on first side 74 of docking platform 70 when vehicle 60 is in the docked position, and loader 20 may be located within a loading area 12 relative to docking platform 70 that is at least substantially on second side 76 of docking platform 70 when loader 20 transports payload 50 to vehicle 60.

Docking platform plane 72 may be described as extending horizontally. As used herein, positional alignment terms such as "horizontal," "vertical," and the like may be used to describe spatial relationships between components of payload transfer systems 10, of payload engagement systems 100, and/or of vehicle docking systems 200 in an illustrative, non-limiting manner, and generally refer to a configuration in which landing gear 66 of vehicle 60 faces a ground surface and/or in which docking platform plane 72 is parallel to a ground surface. As an example, docking platform plane 72 may be described as extending in a horizontal direction. Such terms are provided as context only and do not limit component parts of payload transfer systems 10, of payload engagement systems 100, and/or of vehicle docking systems 200 to always be in a specific orientation relative to ground.

Loader 20 additionally may be configured to transport payload 50 to and away from loading area 12. For example, and as schematically illustrated in FIG. 1, loader 20 may be configured to transport payload 50 between loading area 12 and a payload storage area 14 that is away from docking platform 70. In such an example, loader 20 may be configured to traverse a ground surface to transport payload 50 between loading area 12 and payload storage area 14.

Loader 20 may be configured to support and/or translate payload 50 in any appropriate manner. As an example, and as schematically illustrated in FIGS. 1-8, loader 20 may include a support surface 22 configured to support payload 50. In such an example, support surface 22 may be configured to translate payload 50 along a direction at least substantially parallel to transverse direction 106 to transfer payload 50 to vehicle 60. Additionally or alternatively, support surface 22 may be configured to facilitate payload 50 translating with respect to support surface 22 (such as in a direction parallel to support surface 22) while being supported by support surface 22. Such a configuration may facilitate payload 50 being guided to the coupling position by alignment guide 140 while loader 20 translates payload 50 toward vehicle 60. As a more specific example, and as schematically illustrated in FIG. 1, support surface 22 and/or payload 50 may include a low-friction interface 24 configured to facilitate sliding between payload 50 and support surface 22. As more specific examples, low-friction interface 24 may include a roller, a bearing, and/or a material configured to yield a low coefficient of friction between payload 50 and support surface 22.

Payload transfer system 10 additionally may include one or more components configured to at least partially automate operation of payload engagement system 100 and/or of vehicle docking system 200. As an example, and as schematically illustrated in FIG. 1, payload transfer system 10 may include at least one automated sensor 30 configured to automatically detect a state of at least a portion of payload transfer system 10. As more specific examples, automated sensor(s) 30 may include and/or be alignment sensor 32 for detecting payload 50 in the coupling position and/or position sensor 34 for detecting vehicle 60 in the docked position, as discussed herein. Additionally or alternatively, automated sensor(s) 30 may include and/or be a location sensor 36 configured to determine a location of loader 20, payload 50, vehicle 60, and/or docking platform 70.

As further schematically illustrated in FIG. 1, payload transfer system 10 additionally may include an automated controller 40 configured to coordinate information transfer between at least one automated sensor 30 and at least one other component of payload transfer system 10. As an example, automated controller 40 may be configured to direct latch actuator 120 to transition each engagement latch 110 of payload engagement system 100 from the disengaged configuration to the engaged configuration responsive to alignment sensor 32 detecting payload 50 in the coupling position. As another example, automated controller 40 may be configured to direct retainer actuator 232 to transition each docking receptor unit 220 from the unlocked configuration to the locked configuration responsive to position sensor 34 detecting vehicle 60 in the docked position. As yet another example, automated controller 40 may be configured to guide loader 20 between loading area 12 and payload storage area 14, such as responsive to location sensor 36 determining a position of loader 20. Automated controller 40 may be configured to coordinate information transfer in any appropriate manner. For example, automated controller 40 may be configured to receive information from automated sensor(s) 30 wirelessly and/or via a wired connection. Additionally or alternatively, automated controller 40 may be configured to coordinate information transfer free of human input.

Automated sensor(s) 30 and/or automated controller 40 may include and/or be any suitable device or devices that are configured to perform the functions of automated sensor(s) 30 and/or automated controller 40 discussed herein. For example, automated controller 40 may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure.

Turning now to FIGS. 2-8 more specifically, FIGS. 2-8 schematically illustrate an example of utilizing payload engagement system 100 and vehicle docking system 200 of payload transfer system 10 to bring vehicle 60 to the docked position with respect to docking platform 70, selectively couple payload 50 to vehicle 60, and launch vehicle 60 from docking platform 70. Specifically, FIGS. 2-8 illustrate an example of payload transfer system 10 in which payload 50 includes a pair of engagement receptors 130 and in which vehicle 60 is a UAV that includes a corresponding pair of engagement latches 110. Vehicle 60 of FIGS. 2-8 additionally includes four docking insert units 210 (two of which are visible in the view of FIGS. 2-8), and docking platform 70 of FIGS. 2-8 includes four corresponding docking receptor units 220 (two of which are visible in the view of FIGS. 2-8). Vehicle docking system 200 of FIGS. 2-8 additionally includes two insert retainers 230 associated with each docking receptor unit 220.

Figure 4:
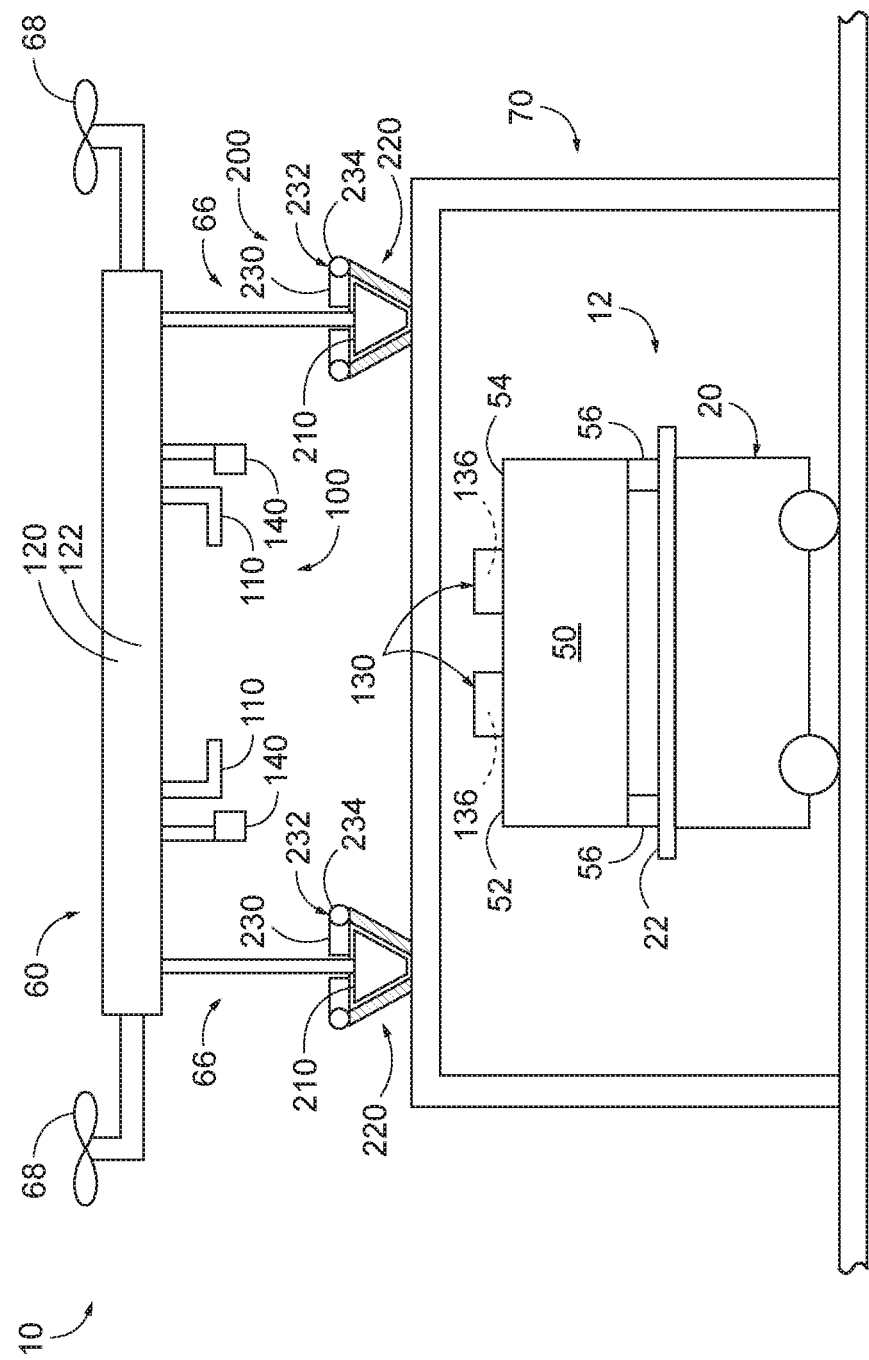
FIG. 4 is a schematic side elevation view representing the payload transfer system of FIGS. 2-3 with the plurality of docking receptor units in a locked configuration according to the present disclosure.
Figure 5:
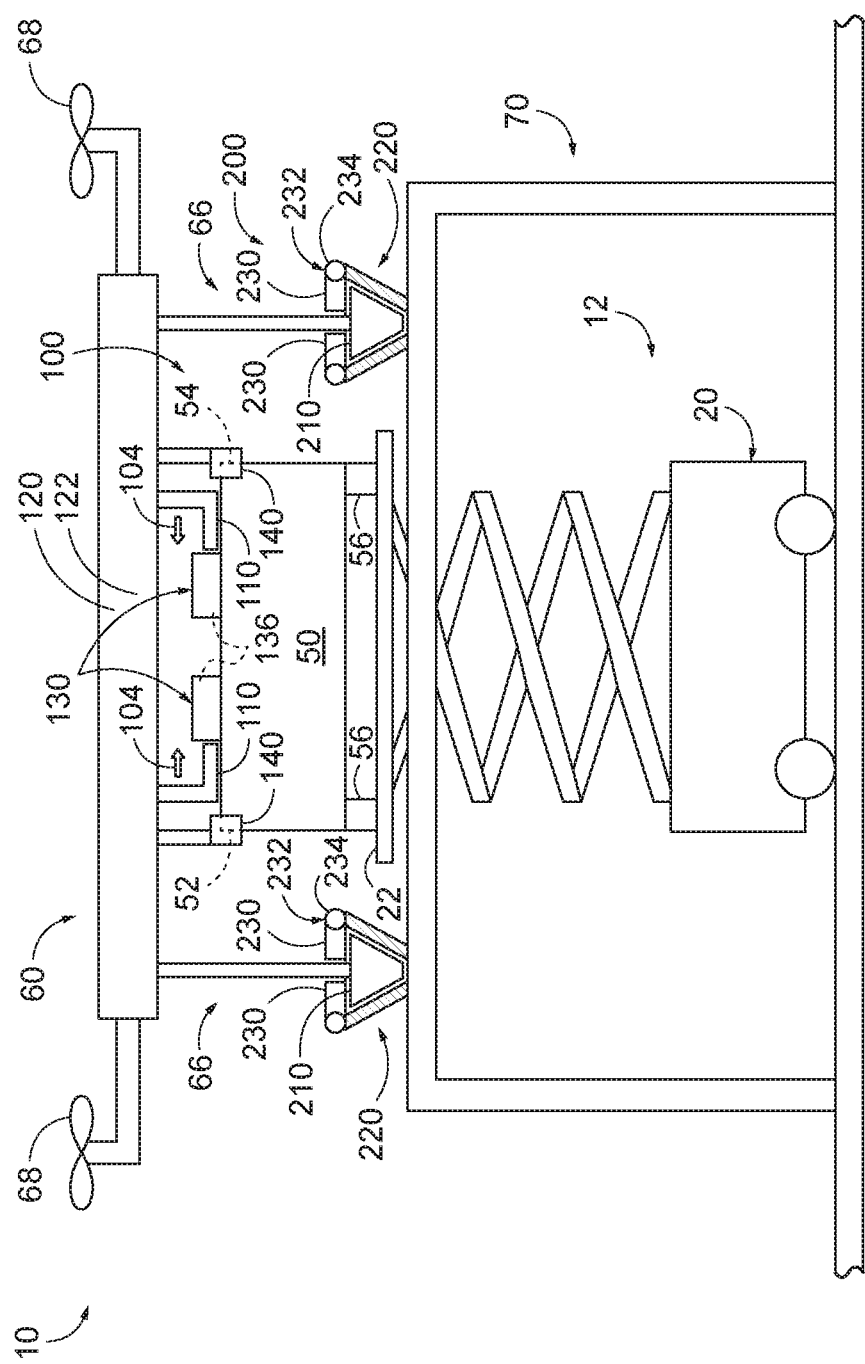
FIG. 5 is a schematic side elevation view representing the payload transfer system of FIGS. 2-4 with a payload in a coupling position relative to the vehicle and with a plurality of engagement latches in a disengaged configuration according to the present disclosure.

FIG. 2 schematically illustrates a state of payload transfer system 10 in which vehicle 60 approaches docking platform 70 from above. In FIG. 2, each engagement latch 110 is in the disengaged configuration and each docking receptor unit 220 is in the unlocked configuration. FIG. 3 schematically illustrates a state of payload transfer system 10 subsequent to that of FIG. 2 in which vehicle 60 has reached the docked position such that each docking insert unit 210 is enclosed within insert receiver 224 of the corresponding docking receptor unit 220. FIG. 4 schematically illustrates a state of payload transfer system 10 subsequent to that of FIG. 3 in which each insert retainer 230 has been pivoted with respect to the corresponding docking receptor unit 220 to mechanically restrict each docking insert unit 210 from being removed from the corresponding docking receptor unit 220, thereby transitioning each docking receptor unit 220 to the locked configuration. FIG. 5 schematically illustrates a state of payload transfer system 10 subsequent to that of FIG. 4 in which loader 20 has translated payload 50 toward vehicle 60 such that payload 50 is in the coupling position. More specifically, FIG. 5 schematically illustrates each corner 52 and each edge 54 of payload 50 being engaged by a corresponding alignment guide 140 of payload engagement system 100 to guide payload 50 to the coupling position. FIG. 5 further schematically illustrates each engagement latch 110 in alignment with each corresponding engagement receptor 130 such that each engagement latch 110 may translate along lateral direction 104 to enter latch receiver 136 of the corresponding engagement receptor 130. FIG. 6 schematically illustrates a state of payload transfer system 10 subsequent to that of FIG. 5 in which each engagement latch 110 has transitioned from the disengaged configuration to the engaged configuration, such that each engagement latch 110 may further translate along transverse direction 106. FIG. 7 schematically illustrates a state of payload transfer system 10 subsequent to that of FIG. 6 in which each engagement latch 110 has translated along transverse direction 106 to transition from the engaged configuration to the secured configuration, thus securing payload 50 to vehicle 60. Finally, FIG. 8 schematically illustrates a state of payload transfer system 10 subsequent to that of FIG. 7 in which each docking receptor unit 220 has transitioned from the locked configuration to the unlocked configuration and vehicle 60 has launched from docking platform 70 while carrying payload 50.

Figure 9:
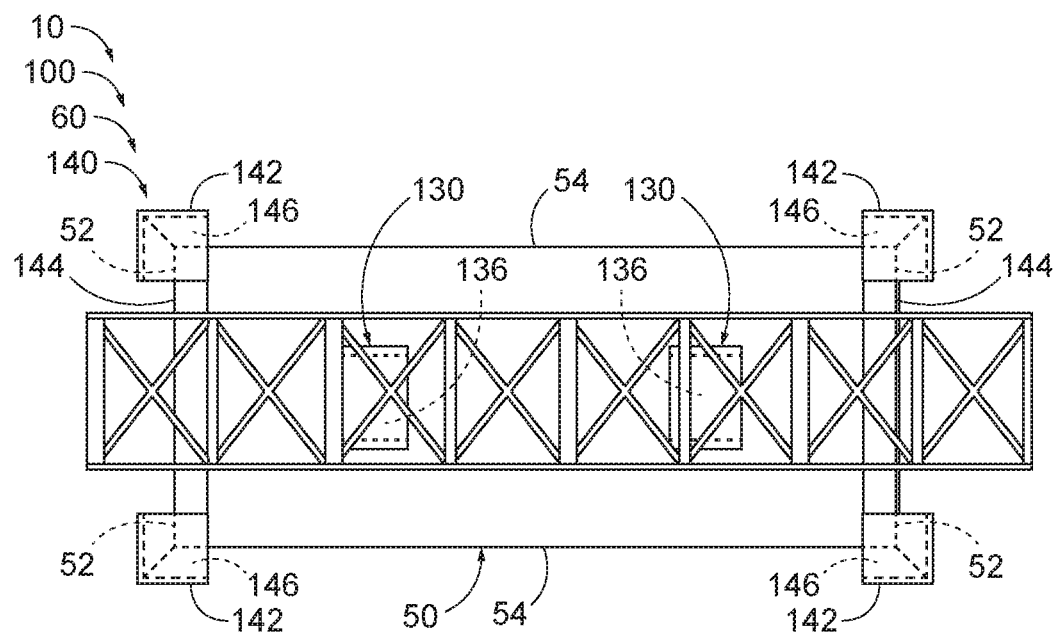
FIG. 9 is a top plan view representing an example of a payload engaged by an alignment guide according to the present disclosure.
Figure 10:
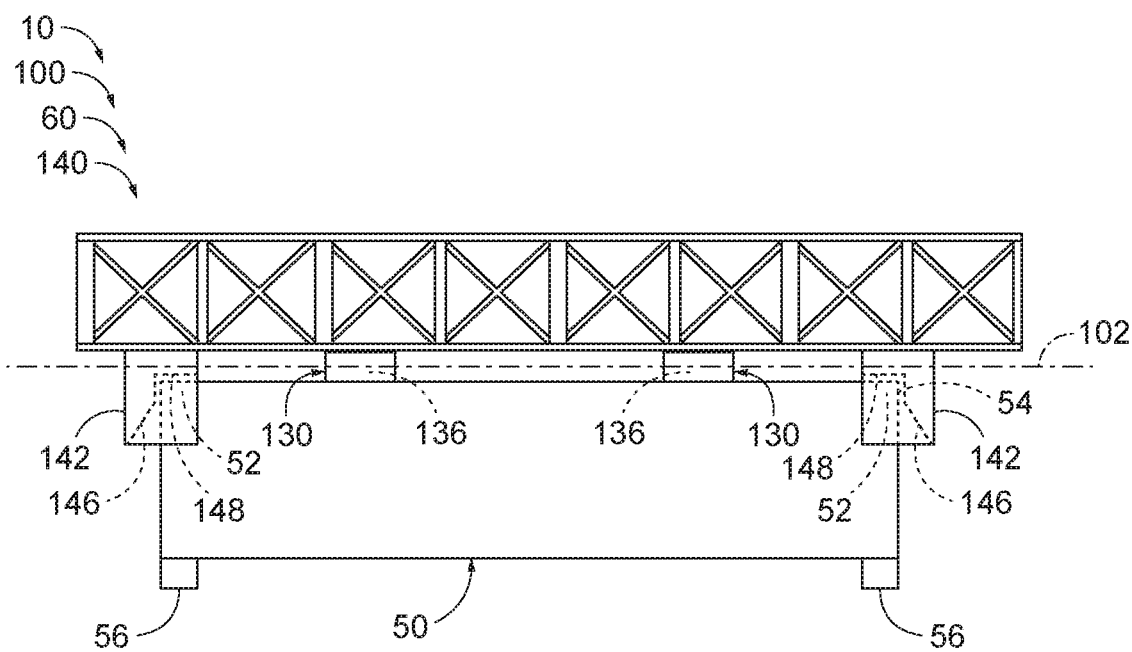
FIG. 10 is a side elevation view representing the payload and alignment guide of FIG. 9 according to the present disclosure.
Figure 11:
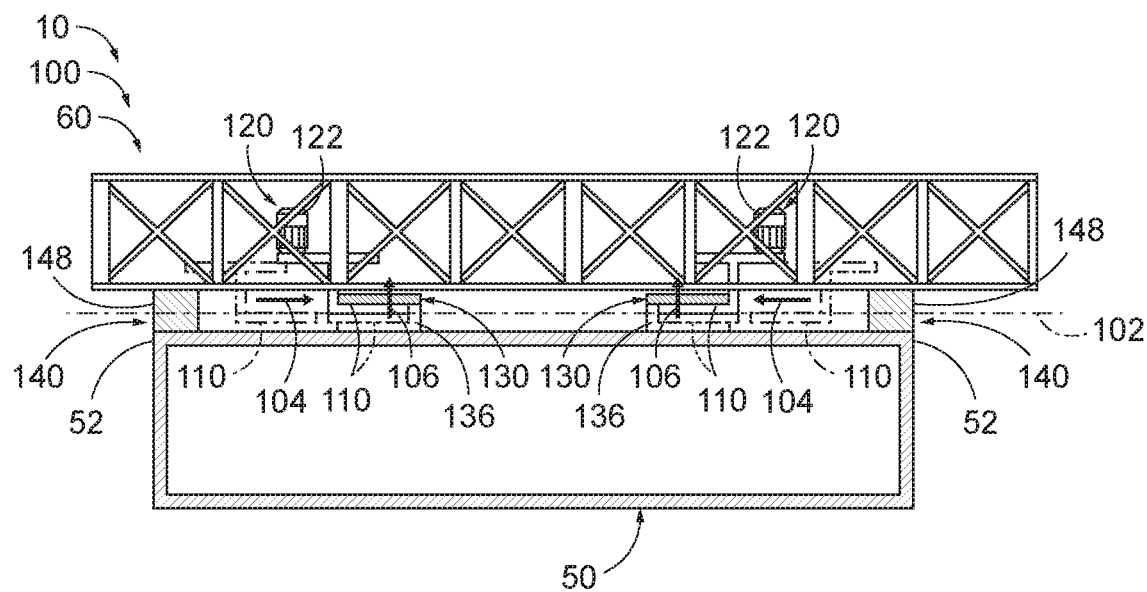
FIG. 11 is a side elevation view representing a pair of engagement latches transitioning from the disengaged configuration to the engaged configuration and further to the secured configuration relative to a pair of engagement receptors according to the present disclosure.
Figure 12:
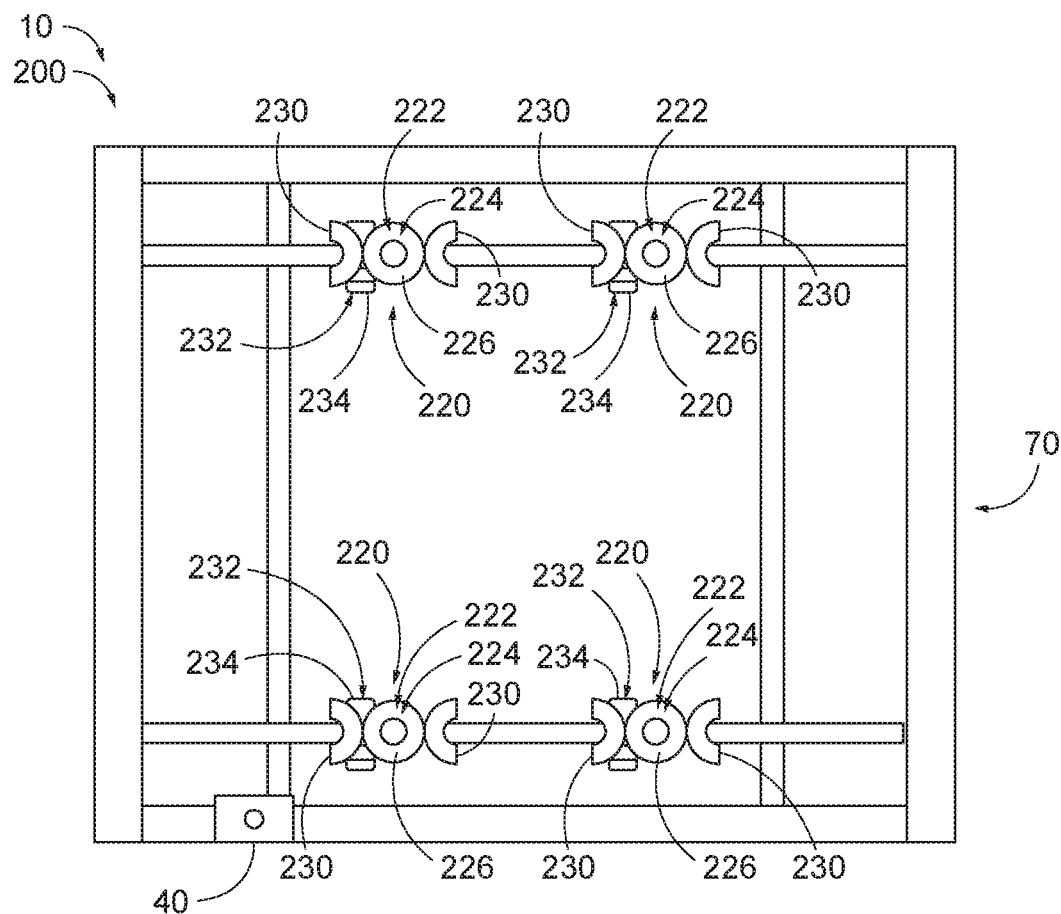
FIG. 12 is a top plan view representing a docking platform with four engagement receptors according to the present disclosure.

Turning now to FIGS. 9-11, FIGS. 9-11 are less schematic illustrations of portions of an example of payload engagement system 100. More specifically, FIGS. 9-11 illustrate portions of an example of payload engagement system 100 in which payload 50 includes a pair of engagement receptors 130 and in which vehicle 60 includes a corresponding pair of engagement latches 110 (illustrated in FIG. 11). FIGS. 9-10 specifically illustrate payload 50 engaged by alignment guide 140 of payload engagement system 100. In the example of FIGS. 9-10, alignment guide 140 includes four corner units 142, each configured to receive a corresponding corner 52 of payload 50, as well as a pair of alignment rails 144, each configured to engage a corresponding edge 54 of payload 50. As illustrated in FIGS. 9-10, each corner unit 142 includes ramped portion 146 as well as payload stop 148. FIG. 11 illustrates payload engagement system 100 of FIGS. 9-10 as each engagement latch 110 engages the corresponding engagement receptor 130. Specifically, FIG. 11 illustrates each engagement latch 110 translating along lateral direction 104 to transition from the disengaged configuration (illustrated in dash-dot lines) to the engaged configuration (illustrated in dash-dot-dot lines) and subsequently translating along transverse direction 106 to transition from the engaged configuration to the secured configuration (illustrated in solid lines). In the example of FIG. 11, each engagement latch 110 is translated by a corresponding latch actuator 120 that includes a corresponding latch actuator motor 122.

Figure 13:
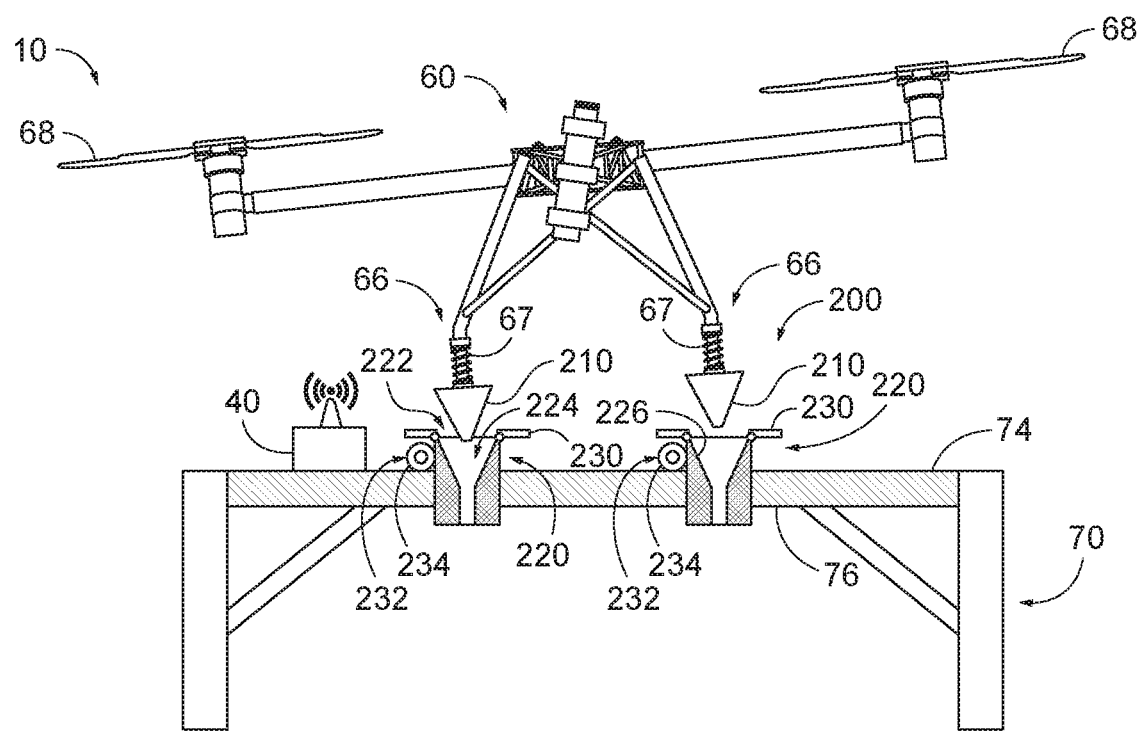
FIG. 13 is a side elevation view representing an example of a payload transfer system with a vehicle approaching the docking platform of FIG. 12 according to the present disclosure.
Figure 14:
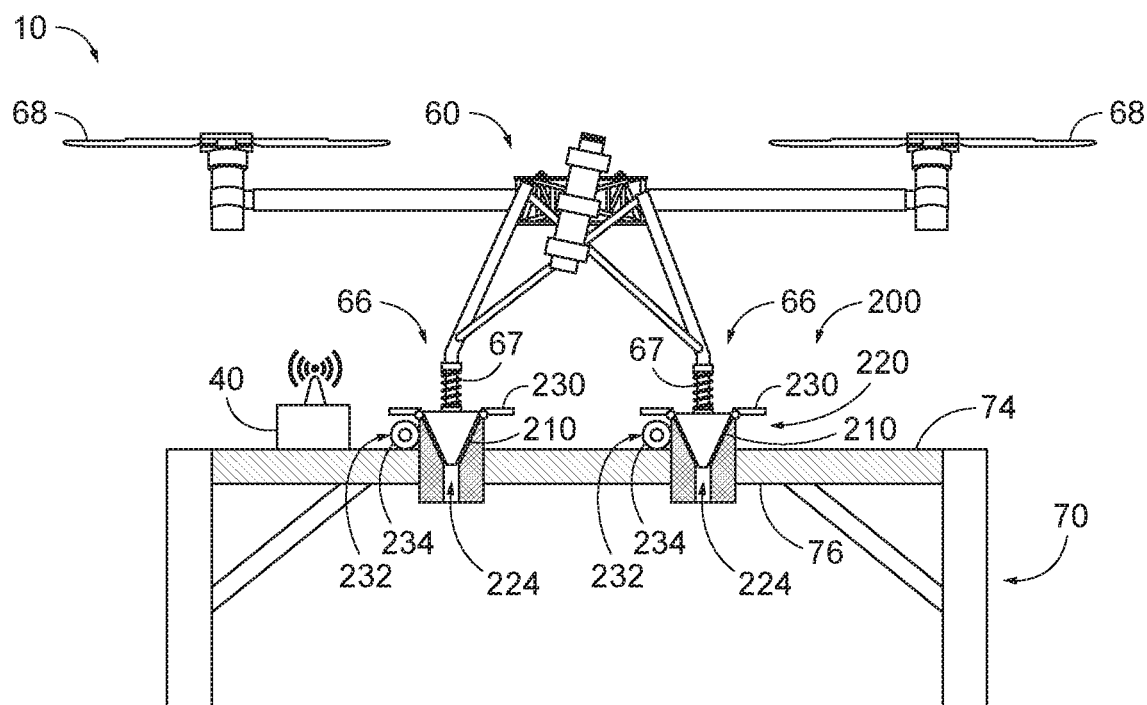
FIG. 14 is a side elevation view representing the payload transfer system of FIG. 13 with the vehicle at the docked position relative to the docking platform and with a plurality of docking receptor units in the unlocked configuration according to the present disclosure.
Figure 15:
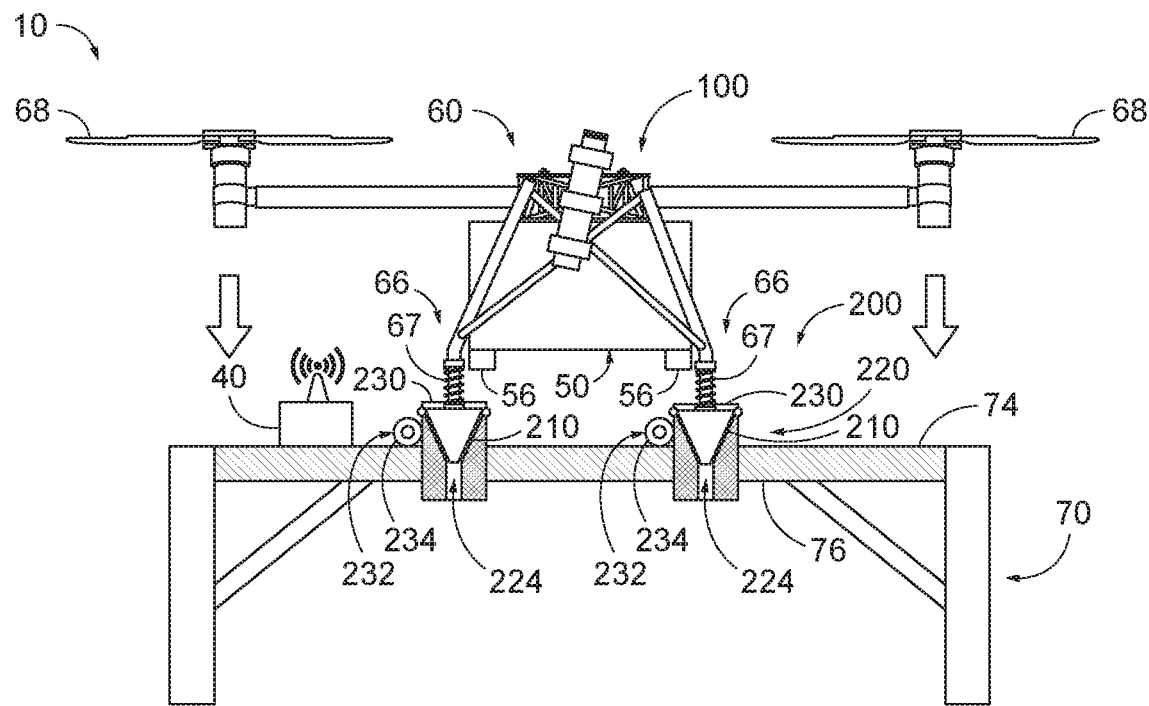
FIG. 15 is a side elevation view representing the payload transfer system of FIGS. 13-14 with the plurality of docking receptors in the locked configuration according to the present disclosure.
Figure 16:
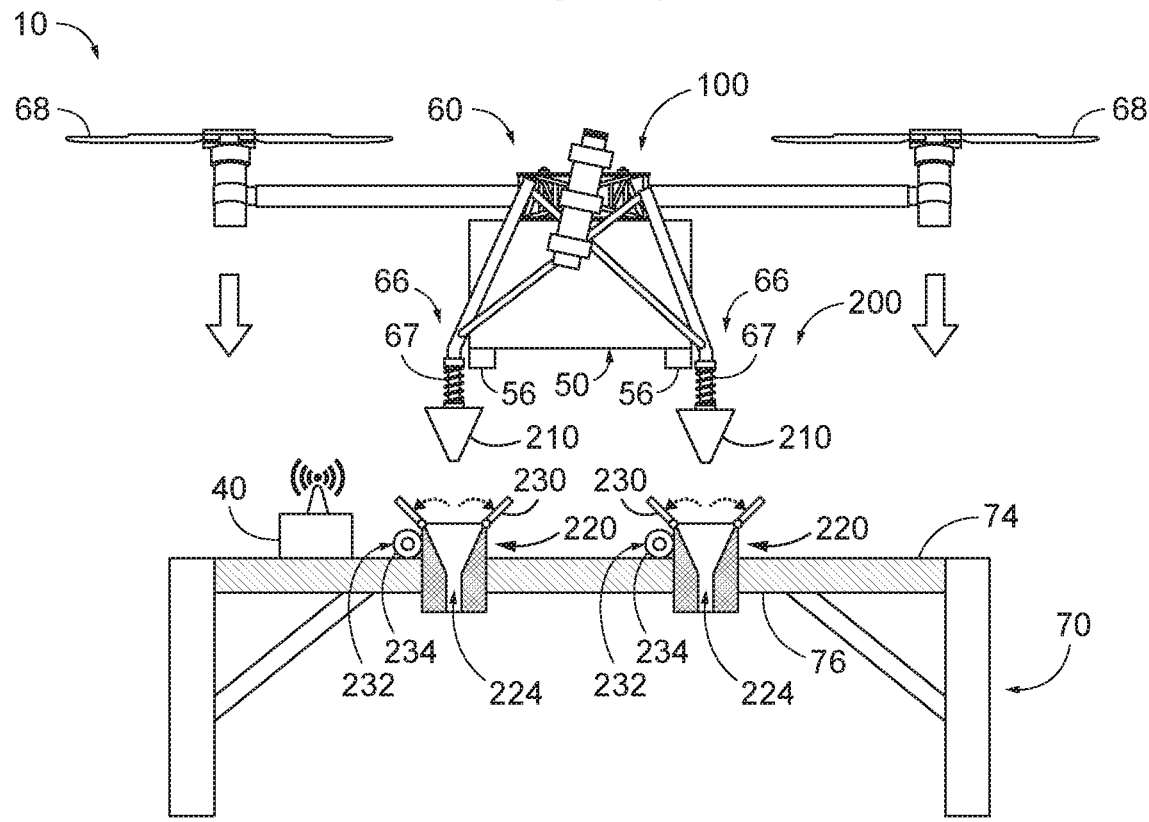
FIG. 16 is a side elevation view representing the payload transfer system of FIGS. 13-15 with the vehicle carrying the payload away from the docking platform according to the present disclosure.

FIGS. 12-16 illustrate portions of an example of vehicle docking system 200. Specifically, and as best illustrated in FIG. 12, FIGS. 12-16 illustrate an example of vehicle docking system 200 in which docking platform 70 includes four docking receptor units 220, each docking receptor unit 220 configured to receive a corresponding docking insert unit 210 (two of which are visible in the views of FIGS. 13-16). As further illustrated in FIGS. 12-16, the example of vehicle docking system 200 of FIGS. 12-16 includes two insert retainers 230 corresponding to each docking receptor unit 220. Each insert retainer 230 is pivoted by retainer actuator 232 with retainer actuator motor 234 to transition each corresponding docking receptor unit 220 between the unlocked configuration (illustrated in FIGS. 12-14 and 16) and the locked configuration (illustrated in FIG. 15). FIGS. 13-16 collectively illustrate a sequence of utilizing the example of vehicle docking system 200 of FIGS. 12-16. Specifically, FIG. 13 illustrates vehicle 60 approaching docking platform 70, while FIG. 14 illustrates vehicle 60 in the docked position with respect to docking platform 70 and with each docking receptor unit 220 in the unlocked configuration. FIG. 15 illustrates vehicle 60 in the docked position with each docking receptor unit 220 in the locked configuration subsequent to operatively coupling payload 50 to vehicle 60, while FIG. 16 illustrates vehicle 60 launching from docking platform 70 while carrying payload 50, subsequent to each docking receptor unit 220 transitioning to the unlocked configuration to release each docking insert unit 210.

Figure 17:
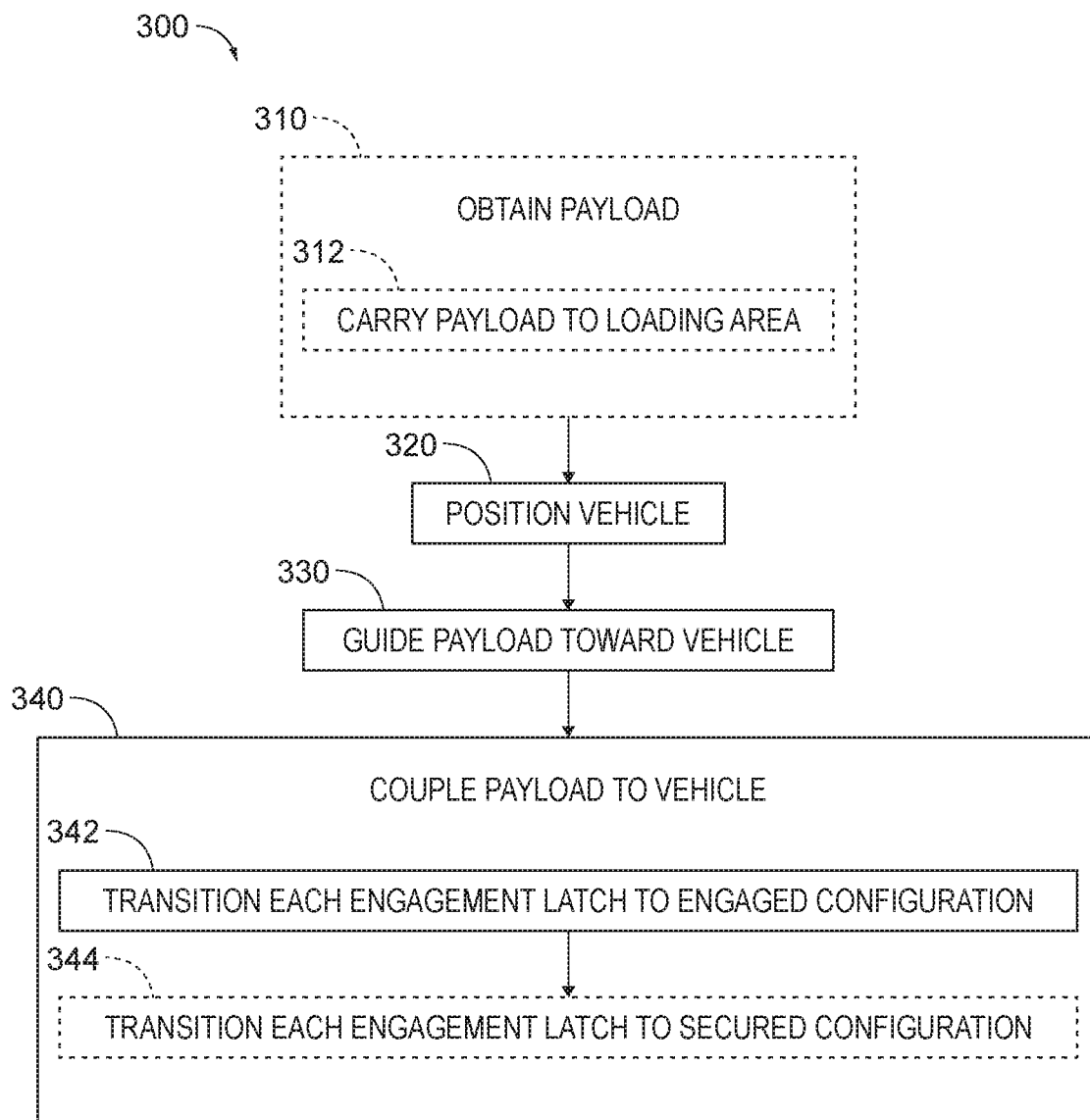
FIG. 17 is a flowchart depicting methods of utilizing a payload engagement system to selectively couple a payload to a vehicle according to the present disclosure.

FIG. 17 is a flowchart depicting methods 300, according to the present disclosure, of utilizing a payload engagement system (such as payload engagement system 100) to selectively couple a payload to a vehicle. As shown in FIG. 17, a method 300 includes positioning, at 320, a vehicle (such as vehicle 60) on a first side of a docking platform (such as first side 74 of docking platform 70); guiding, at 330, a payload (such as payload 50) toward the vehicle; and coupling, at 340, the payload to the vehicle.

The guiding at 330 includes guiding the payload toward the vehicle from a second side of the docking platform (such as second side 76 of docking platform 70), which is opposite the first side of the docking platform, to position the payload in a predetermined coupling position relative to the vehicle. The guiding at 330 may be performed in any appropriate manner. For example, the guiding at 330 may include guiding the payload toward the vehicle with a loader (such as loader 20) that is configured to transfer the payload to the vehicle. In such an example, the loader may be located in a loading area (such as loading area 12) relative to the docking platform that is at least substantially on the second side of the docking platform when the loader guides the payload toward the vehicle. Additionally or alternatively, in such an example, the guiding at 330 may include translating a support surface (such as support surface 22) of the loader toward the vehicle along a transverse direction (such as transverse direction 106).

The guiding at 330 additionally may include guiding to align the payload and the vehicle, such as to position the payload at the coupling position. For example, the guiding at 330 may include passively guiding the payload to the coupling position with an alignment guide (such as alignment guide 140), such as may be included by the vehicle. In such an example, the payload may include a plurality of corners (such as corners 52), and the alignment guide may include a plurality of corner units (such as corner units 142), each corner unit having a ramped portion (such as ramped portion 146). In such an example, the guiding at 330 may include passively guiding the payload toward the coupling position by engaging each corner of the payload with the ramped portion of a corresponding corner unit.

The vehicle of methods 300 includes at least one engagement latch (such as engagement latch 110) and the payload of methods 300 includes at least one engagement receptor (such as engagement receptor 130) such that the coupling at 340 includes engaging each engagement receptor with a corresponding engagement latch. Specifically, when the payload is in the coupling position relative to the vehicle, each engagement receptor is in alignment with the corresponding engagement latch within an alignment plane (such as alignment plane 102), and the coupling at 340 includes transitioning, at 342, each engagement latch from a disengaged configuration to an engaged configuration. More specifically, each engagement latch is removed from each engagement receptor when the engagement latch is in the disengaged configuration, and each engagement latch engages a corresponding engagement receptor when the engagement latch is in the engaged configuration.

The transitioning at 342 may be performed in any appropriate manner. For example, the transitioning at 342 may include translating each engagement latch in a lateral direction (such as lateral direction 104) that is at least substantially parallel to the alignment plane. As a more specific example, the at least one engagement receptor may include a first engagement receptor (such as first engagement receptor 132) and a second engagement receptor (such as second engagement receptor 134) that are positioned in a spaced-apart arrangement on the payload. In such an example, the at least one engagement latch may include a first engagement latch (such as first engagement latch 112) configured to engage the first engagement receptor and a second engagement latch (such as second engagement latch 114) configured to engage the second engagement receptor. The first engagement latch and the second engagement latch may be spaced apart from each other such that the first engagement latch engages the first engagement receptor and the second engagement latch engages the second engagement receptor when each engagement latch is in the engaged configuration. In such an example, the transitioning at 342 may include translating the first engagement latch and the second engagement latch toward each other.

The transitioning at 342 may be performed at least partially automatically. For example, the transitioning at 342 may be performed responsive to an alignment sensor (such as alignment sensor 32) detecting that the payload is in the coupling position such that each engagement receptor is in alignment with the corresponding engagement latch As additionally shown in FIG. 17, in an example of method 300 that includes utilizing the loader, method 300 may include, prior to the guiding at 330, obtaining, at 310, the payload with the loader. In such an example, and as shown in FIG. 17, the obtaining at 310 may include obtaining the payload from a payload storage area (such as payload storage area 14) that is away from the loading area and carrying, at 312, the payload from the payload storage area to the loading area. The carrying at 312 may be performed at least partially automatically. For example, the carrying at 312 may include guiding the loader to the loading area with an automated controller (such as automated controller 40).

As further shown in FIG. 17, the coupling at 340 additionally may include transitioning, at 344, each engagement latch to a secured configuration to secure the payload to the vehicle. In such an example, the transitioning at 344 may include translating each engagement latch in the transverse direction to transition each engagement latch to the secured configuration. The transitioning at 344 may be performed subsequent to the transitioning at 342, or may be performed at least partially concurrently with the transitioning at 342.

Figure 18:
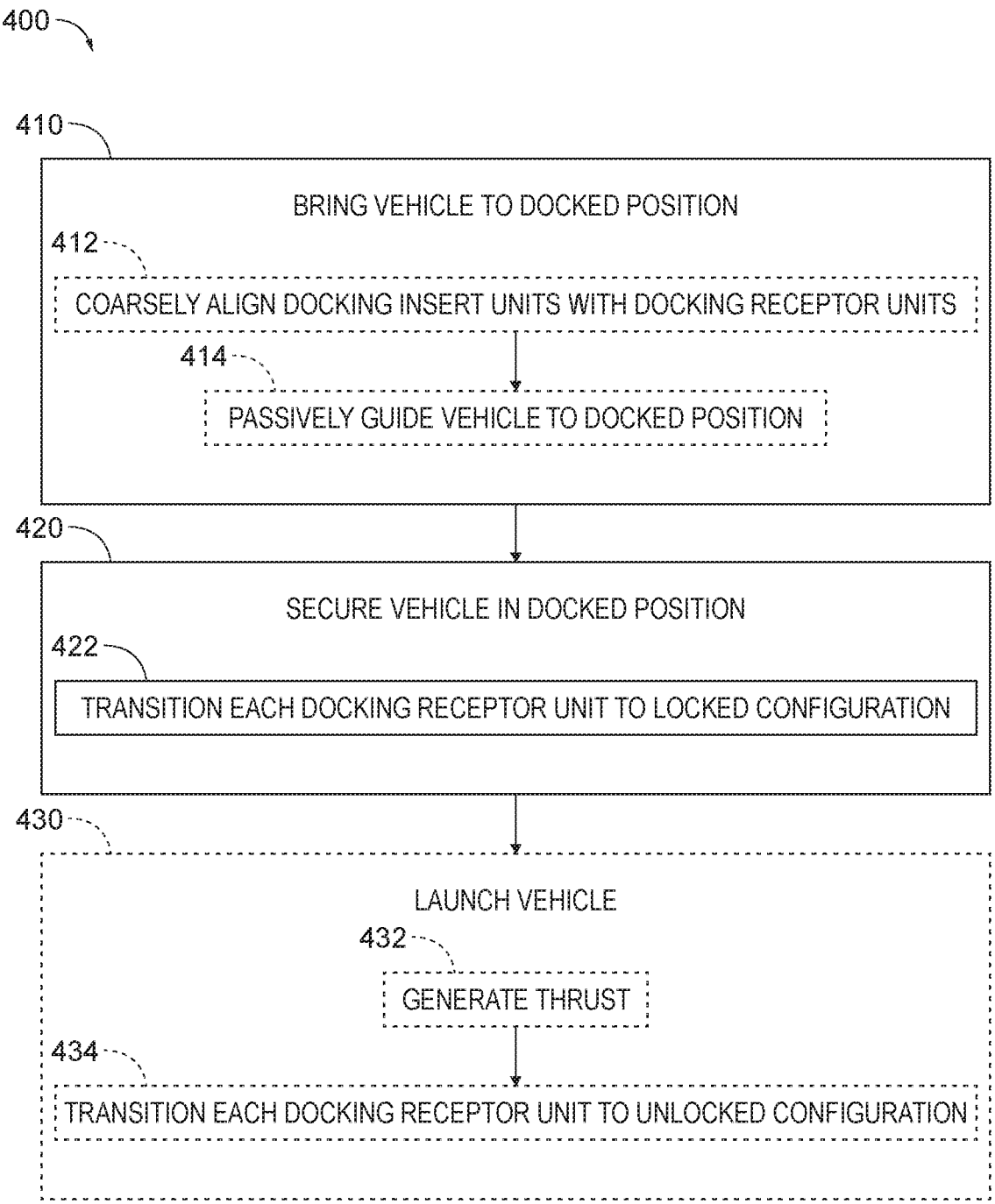
FIG. 18 is a flowchart depicting methods of utilizing a vehicle docking system to selectively retain a vehicle in a docked position relative to a docking platform according to the present disclosure.

FIG. 18 is a flowchart depicting methods 400, according to the present disclosure, of utilizing a vehicle docking system (such as vehicle docking system 200) to selectively retain a vehicle in a docked position relative to a docking platform. As shown in FIG. 18, a method 400 includes bringing, at 410, a vehicle (such as vehicle 60) to a docked position relative to a docking platform (such as docking platform 70) and securing, at 420, the vehicle in the docked position. More specifically, the docking platform of methods 400 includes a plurality of docking receptor units (such as docking receptor units 220) having a geometric arrangement, and the vehicle of methods 400 includes a plurality of docking insert units (such as docking insert units 210) having a geometric arrangement corresponding to that of the plurality of docking receptor units. When the vehicle is in the docked position, each docking insert unit is received in a corresponding docking receptor unit to maintain the vehicle in the docked position.

As shown in FIG. 18, the securing at 420 includes transitioning, at 422, each docking receptor unit from an unlocked configuration to a locked configuration. More specifically, when each docking receptor unit is in the unlocked configuration, the corresponding docking insert unit is free to be inserted into and removed from the docking receptor unit. When each docking receptor unit is in the locked configuration, the corresponding docking insert unit is restricted from being removed from the docking receptor unit when the vehicle is in the docked position. The transitioning at 422 may be performed in any appropriate manner. As an example, the transitioning at 422 may include rotating at least one insert retainer (such as insert retainer 230) to restrict a corresponding docking insert unit from being removed from the docking receptor unit. However, this is not required to all examples of method 400, and it is additionally within the scope of the present disclosure that the transitioning at 422 may include linearly translating each insert retainer, horizontally sliding each insert retainer, rotating each insert retainer within a horizontal plane, rotating each insert retainer within a vertical plane, rotating each insert retainer about a horizontal axis, and/or rotating each insert retainer about a vertical axis.

The bringing at 410 may be performed in any appropriate manner. For example, and as shown in FIG. 18, the bringing at 410 may include coarsely aligning, at 412, each docking insert unit with the corresponding docking receptor unit and subsequently passively guiding, at 414, the vehicle to the docked position. The coarsely aligning at 412 may be performed at least partially automatically. For example, the coarsely aligning at 412 may include guiding the vehicle toward the docking platform with an automated controller (such as automated controller 40). The passively guiding at 414 also may be performed in any appropriate manner. As an example, the passively guiding at 414 may include engaging each docking insert unit with the corresponding docking receptor unit to bring the vehicle to the docked position. As a more specific example, each docking receptor unit may include an insert receiver (such as insert receiver 224) that is configured to receive and guide a corresponding docking insert unit into alignment with the docking receptor unit while the vehicle approaches the docked position. In such an example, each insert receiver may include a sloped portion (such as sloped portion 226) configured to engage the corresponding docking insert unit to passively guide the corresponding docking insert unit into the docking receptor unit. In such an example, the passively guiding at 414 may include engaging each docking insert unit with the sloped portion of the insert receiver of the corresponding docking receptor unit.

As further shown in FIG. 18, methods 400 additionally may include, subsequent to the transitioning at 422, launching, at 430, the vehicle from the docking platform. The launching at 430 may be performed in any appropriate manner. As an example, the vehicle may include a thrust generator (such as thrust generator 68) configured to propel the vehicle away from the docking platform. In such an example, the launching at 430 may include generating, at 432, thrust with each thrust generator away from the docking platform and transitioning, at 434, each docking receptor unit from the locked configuration to the unlocked configuration. In such an example, the generating at 432 and the transitioning at 434 may be performed in any appropriate order. For example, the generating at 432 may be performed and/or initiated prior to the transitioning at 434. Such a procedure may facilitate stably launching the vehicle from the docking platform. For example, in an embodiment in which the vehicle includes a plurality of thrust generators (such as a rotorcraft with a plurality of rotors, in which each rotor is a thrust generator), each thrust generator may begin to produce thrust at a different rate such that the vehicle may depart the docking platform unstably and/or unevenly if not positively secured to the docking platform. Hence, performing the generating at 432 prior to the transitioning at 434 may permit each thrust generator to generate a stable and even thrust prior to releasing the vehicle from the docking platform, thereby facilitating a stable and controlled launch of the vehicle from the docking platform. Accordingly, in such an example, the transitioning at 434 may include transitioning each docking receptor unit from the locked configuration to the unlocked configuration simultaneously. However, this is not required to all examples of methods 400, and it is additionally within the scope of the present disclosure that the generating at 432 may be performed subsequent to the transitioning at 434.

Illustrative, non-exclusive examples of inventive subject matter according to the present disclosure are described in the following enumerated paragraphs:

A1. A payload engagement system for selectively coupling a payload to a vehicle, comprising:
a vehicle that includes at least one engagement latch; and
a payload that includes at least one engagement receptor;
wherein each engagement latch is configured to selectively engage a corresponding engagement receptor of the at least one engagement receptor to selectively couple the payload to the vehicle; wherein each engagement latch is configured to be selectively transitioned between an engaged configuration, in which each engagement latch engages the corresponding engagement receptor to couple the payload to the vehicle, and a disengaged configuration, in which each engagement latch is removed from each engagement receptor; wherein the payload engagement system includes an alignment guide configured to guide the payload to a predetermined coupling position relative to the vehicle to establish alignment of each engagement latch relative to the corresponding engagement receptor in an alignment plane prior to each engagement latch transitioning from the disengaged configuration to the engaged configuration; and wherein each engagement latch is configured to translate in a lateral direction that is at least substantially parallel to the alignment plane as the engagement latch transitions between the engaged configuration and the disengaged configuration.

A2. The payload engagement system of paragraph A1, wherein the at least one engagement latch includes one of one engagement latch, two engagement latches, three engagement latches, four engagement latches, and more than four engagement latches.

A3. The payload engagement system of any of paragraphs A1-A2, wherein the at least one engagement receptor includes one of one engagement receptor, two engagement receptors, three engagement receptors, four engagement receptors, and more than four engagement receptors.

A4. The payload engagement system of any of paragraphs A1-A3, wherein each engagement receptor is fixedly mounted to the payload.

A5. The payload engagement system of any of paragraphs A1-A4, wherein each engagement latch is spaced apart from the corresponding engagement receptor when each engagement latch is in the engaged configuration.

A6. The payload engagement system of any of paragraphs A1-A5, wherein the payload is restricted from being removed from the vehicle when each engagement latch is in the engaged configuration.

A7. The payload engagement system of any of paragraphs A1-A6, wherein each engagement receptor includes a latch receiver, and wherein each engagement latch is at least partially received within the latch receiver of the corresponding engagement receptor when the engagement latch is in the engaged configuration.

A8. The payload engagement system of any of paragraphs A1-A7, wherein the payload engagement system further is configured to transition each engagement latch between the engaged configuration and a secured configuration when each engagement latch is engaged with the corresponding engagement receptor; wherein the payload is restricted from moving relative to the vehicle while the vehicle carries the payload and when each engagement latch is in the secured configuration; and wherein each engagement latch is configured to translate in a transverse direction that is at least substantially perpendicular to the alignment plane as the engagement latch is transitioned between the engaged configuration and the secured configuration.

A9. The payload engagement system of any of paragraphs A1-A8, wherein the alignment guide is disposed on a lower side of the vehicle and is configured to guide and establish alignment of the payload and the vehicle to establish alignment of each engagement latch relative to the corresponding engagement receptor.

A10. The payload engagement system of paragraph A9, wherein the alignment guide is configured to guide the payload to the coupling position relative to the vehicle.

A11. The payload engagement system of any of paragraphs A9-A10, wherein the alignment guide includes a ramped portion configured to engage at least a portion of the payload to passively guide the payload to the coupling position when each engagement receptor approaches a corresponding engagement latch of the at least one engagement latch along a/the transverse direction that is at least substantially perpendicular to the alignment plane.

A12. The payload engagement system of paragraph A11, wherein the ramped portion is configured to translate the payload in a direction at least substantially parallel to the alignment plane when each engagement receptor approaches the corresponding engagement latch along the transverse direction.

A13. The payload engagement system of any of paragraphs A9-A12, wherein the payload includes a plurality of corners; and wherein the alignment guide includes a plurality of corner units, each corner unit configured to receive a corresponding corner of the payload when the payload approaches the coupling position.

A14. The payload engagement system of paragraph A13, when dependent from paragraph A11, wherein at least one corner unit includes the ramped portion.

A15. The payload engagement system of any of paragraphs A9-A14, wherein the payload includes a plurality of edges, and wherein the alignment guide includes a plurality of alignment rails, each alignment rail configured to engage a corresponding edge of the payload when the payload approaches the coupling position.

A16. The payload engagement system of paragraph A15, when dependent from paragraph A11, wherein at least one alignment rail of the plurality of alignment rails includes the ramped portion.

A17. The payload engagement system of any of paragraphs A15-A16, wherein each alignment rail extends between a corresponding pair of corner units of the plurality of corner units.

A18. The payload engagement system of any of paragraphs A9-A17, wherein the alignment guide includes at least one payload stop configured to engage the payload when the payload is in the coupling position to limit an extent to which the payload may be translated toward the vehicle along a/the transverse direction.

A19. The payload engagement system of paragraph A18, wherein each engagement latch is configured to positively retain the payload against each payload stop when the payload is in the coupling position and when each engagement latch is in a/the secured configuration.

A20. The payload engagement system of any of paragraphs A1-A19, wherein the vehicle includes a latch actuator configured to translate each engagement latch in the lateral direction to transition each engagement latch between the engaged configuration and the disengaged configuration.

A21. The payload engagement system of paragraph A20, wherein the latch actuator is further configured to translate each engagement latch in a/the transverse direction that is at least substantially perpendicular to the alignment plane to transition each engagement latch between the engaged configuration and a/the secured configuration.

A22. The payload engagement system of paragraph A21, wherein the latch actuator is configured to sequentially:

(i) translate each engagement latch along the lateral direction; and (ii) translate each engagement latch along the transverse direction.

A23. The payload engagement system of paragraph A22, wherein the latch actuator is configured to translate each engagement latch along the lateral direction and along the transverse direction at least partially concurrently.

A24. The payload engagement system of any of paragraphs A20-A23, wherein the latch actuator includes at least one latch actuator motor, wherein each latch actuator motor is configured to translate the at least one corresponding engagement latch along at least one of the lateral direction and a/the transverse direction.

A25. The payload engagement system of paragraph A24, wherein each latch actuator motor is configured to translate a single corresponding engagement latch of the at least one engagement latch.

A26. The payload engagement system of paragraph A24, wherein the at least one engagement latch includes at least two engagement latches, and wherein each latch actuator motor is configured to translate each of a corresponding plurality of engagement latches of the at least two engagement latches.

A27. The payload engagement system of any of paragraphs A24-A26, wherein each latch actuator motor is configured to translate the at least one corresponding engagement latch along one of the lateral direction and the transverse direction.

A28. The payload engagement system of any of paragraphs A24-A26, wherein each latch actuator motor is configured to translate the at least one corresponding engagement latch along each of the lateral direction and the transverse direction.

A29. The payload engagement system of any of paragraphs A20-A28, wherein the payload engagement system further includes an alignment sensor configured to detect when the payload is in the coupling position, and wherein the latch actuator is configured to transition each engagement latch from the disengaged configuration to the engaged configuration responsive to the alignment sensor detecting the payload in the coupling position.

A30. The payload engagement system of any of paragraphs A1-A29, wherein the at least one engagement receptor includes a first engagement receptor and a second engagement receptor; wherein the first engagement receptor and the second engagement receptor are positioned in a spaced-apart arrangement on the payload; wherein the at least one engagement latch includes a first engagement latch configured to engage the first engagement receptor and a second engagement latch configured to engage the second engagement receptor; and wherein the first engagement latch and the second engagement latch are spaced apart from each other such that the first engagement latch engages the first engagement receptor and the second engagement latch engages the second engagement receptor when each engagement latch is in the engaged configuration.

A31. The payload engagement system of paragraph A30, wherein the first engagement latch and the second engagement latch are configured to translate toward each other while each engagement latch transitions from the disengaged configuration to the engaged configuration.

B1. A vehicle docking system for selectively retaining a vehicle in a docked position relative to a docking platform, comprising:

a vehicle that includes landing gear having an associated plurality of docking insert units in a geometric arrangement; and a docking platform that includes a plurality of docking receptor units;

wherein each docking receptor unit is configured to selectively engage a corresponding docking insert unit of the plurality of docking insert units to selectively retain the vehicle in a docked position relative to the docking platform; wherein the plurality of docking receptor units has a geometric arrangement corresponding to the geometric arrangement of the plurality of docking insert units; wherein, when the vehicle is in the docked position, each docking insert unit is received in a corresponding docking receptor unit to maintain the vehicle in the docked position; and wherein each docking receptor unit is configured to transition between an unlocked configuration, in which the corresponding docking insert unit is free to be inserted into and removed from the docking receptor unit, and a locked configuration, in which the corresponding docking insert unit is restricted from being removed from the docking receptor unit when the vehicle is in the docked position.

B2. The vehicle docking system of paragraph B1, wherein the plurality of docking receptor units includes one of two docking receptor units, three docking receptor units, four docking receptor units, and more than four docking receptor units.

B3. The vehicle docking system of any of paragraphs B1-B2, wherein the plurality of docking insert units includes one of two docking insert units, three docking insert units, four docking insert units, and more than four docking insert units.

B4. The vehicle docking system of any of paragraphs B1-B3, wherein the vehicle docking system includes at least one insert retainer associated with a corresponding docking receptor unit of the plurality of docking receptor units and configured to selectively restrict a corresponding docking insert unit of the plurality of docking insert units from being removed from the corresponding docking receptor unit when the vehicle is in the docked position and when the docking receptor unit is in the locked configuration.

B5. The vehicle docking system of paragraph B4, wherein each insert retainer is configured to mechanically restrict the corresponding docking insert unit from being removed from the docking receptor unit when the vehicle is in the docked position and when the docking receptor unit is in the locked configuration.

B6. The vehicle docking system of any of paragraphs B4-B5, wherein each docking receptor unit includes a receptor opening, wherein each docking receptor unit is configured to receive the corresponding docking insert unit via the receptor opening, and wherein the each insert retainer at least substantially covers the receptor opening of each docking receptor unit when the docking receptor unit is in the locked configuration.

B7. The vehicle docking system of any of paragraphs B1-B6, wherein the vehicle docking system further includes a retainer actuator configured to transition at least one docking receptor unit between the unlocked configuration and the locked configuration.

B8. The vehicle docking system of paragraph B7, when dependent from paragraph B4, wherein each insert retainer is hingedly coupled to the corresponding docking receptor unit, and wherein the retainer actuator is configured to pivot each insert retainer relative to the corresponding docking receptor unit to mechanically restrict the corresponding docking insert unit from being removed from each docking receptor unit when the vehicle is in the docked position and when the docking receptor unit is in the locked configuration.

B9. The vehicle docking system of any of paragraphs B7-B8, wherein the vehicle docking system further includes a position sensor configured to detect when the vehicle is in the docked position, and wherein the retainer actuator is configured to pivot each insert retainer responsive to the position sensor detecting the vehicle in the docked position.

B10. The vehicle docking system of any of paragraphs B7-B9, when dependent from paragraph B4, wherein the retainer actuator includes at least one retainer actuator motor, wherein each retainer actuator motor is configured to actuate at least one of the at least one insert retainer to transition the at least one docking receptor unit between the unlocked configuration and the locked configuration.

B11. The vehicle docking system of paragraph B10, wherein each retainer actuator motor is configured to actuate a single corresponding insert retainer of the at least one insert retainer.

B12. The vehicle docking system of paragraph B10, wherein the at least one insert retainer includes at least two insert retainers, and wherein each retainer actuator motor is configured to actuate each of a corresponding plurality of insert retainers of the at least two insert retainers.

B13. The vehicle docking system of any of paragraphs B1-B12, wherein each docking receptor unit includes an insert receiver that is configured to receive and guide a corresponding docking insert unit of the plurality of docking insert units into alignment with the docking receptor unit while the vehicle approaches the docked position.

B14. The vehicle docking system of paragraph B13, wherein each docking insert unit is at least substantially enclosed by the insert receiver of the corresponding docking receptor unit when the vehicle is in the docked position.

B15. The vehicle docking system of any of paragraphs B13-B14, wherein each docking insert unit is at least substantially conical, optionally frusto-conical, and wherein the insert receiver of each docking receptor unit is at least substantially conical, optionally frusto-conical.

B16. The vehicle docking system of any of paragraphs B13-B15, wherein the insert receiver of each docking receptor unit includes a sloped portion configured to engage the corresponding docking insert unit to passively guide the corresponding docking insert unit into the docking receptor unit.

B17. The vehicle docking system of any of paragraphs B1-B16, wherein the landing gear includes at least one shock absorber configured to resiliently contract when the vehicle engages the docking platform.

B18. The vehicle docking system of any of paragraphs B1-B17, wherein the landing gear is configured to support the vehicle upon at least one of the docking platform and a ground surface, and wherein the landing gear includes each docking insert unit.

C1. A payload transfer system for transferring a payload to a vehicle, the payload transfer system comprising:
the payload engagement system of any of paragraphs A1-A31; and
the vehicle docking system of any of paragraphs B1-B18;
wherein the vehicle of the payload engagement system is the vehicle of the vehicle docking system.

C2. The payload transfer system of paragraph C1, wherein the payload transfer system further includes a loader configured to transfer the payload to the vehicle.

C3. The payload transfer system of paragraph C2, wherein the docking platform defines a docking platform plane; wherein the docking platform plane separates a first side of the docking platform and a second side of the docking platform; wherein the vehicle is positioned at least substantially on the first side of the docking platform when the vehicle is in the docked position; and wherein the loader is located within a loading area relative to the docking platform that is at least substantially on the second side of the docking platform when the loader transports the payload to the vehicle.

C4. The payload transfer system of any of paragraphs C2-C3, wherein the loader is configured to transport the payload between the loading area and a payload storage area that is away from the docking platform.

C5. The payload transfer system of paragraph C4, wherein the loader is configured to traverse a ground surface to transport the payload between the loading area and the payload storage area.

C6. The payload transfer system of any of paragraphs C2-C5, wherein the loader includes a support surface configured to support the payload.

C7. The payload transfer system of paragraph C6, wherein the support surface is configured to translate the payload along a direction that is at least substantially parallel to a/the transverse direction to transfer the payload to the vehicle when the vehicle is in the docked position.

C8. The payload transfer system of any of paragraphs C6-C7, wherein at least one of the payload and the support surface includes a low-friction interface configured to facilitate sliding between the payload and the support surface.

C9. The payload transfer system of paragraph C8, wherein the low-friction interface includes at least one of a roller, a bearing, and a material configured to yield a low coefficient of friction between the payload and the support surface.

C10. The payload transfer system of any of paragraphs C1-C10, wherein the payload transfer system further includes at least one automated sensor configured to automatically detect a state of at least a portion of the payload transfer system.

C11. The payload transfer system of paragraph C10, when dependent from paragraph A29, wherein the at least one automated sensor includes the alignment sensor.

C12. The payload transfer system of any of paragraphs C10-C11, when dependent from paragraph B9, wherein the at least one automated sensor includes the position sensor.

C13. The payload transfer system of any of paragraphs C10-C12, wherein the at least one automated sensor includes a location sensor configured to determine a location of at least one of the loader, the payload, the vehicle, and the docking platform.

C14. The payload transfer system of any of paragraphs C10-C13, wherein the payload transfer system further includes an automated controller configured to coordinate information transfer between the at least one automated sensor and at least one other component of the payload transfer system.

C15. The payload transfer system of paragraph C14, wherein the automated controller is configured to receive information from the at least one automated sensor wirelessly.

C16. The payload transfer system of any of paragraphs C14-C15, wherein the automated controller is configured to receive information from the at least one automated sensor via a wired connection.

C17. The payload transfer system of any of paragraphs C14-C16, wherein the automated controller is configured to coordinate information transfer free of human input.

C18. The payload transfer system of any of paragraphs C14-C17, when dependent from paragraph C11, wherein the automated controller is configured to direct the latch actuator to transition each engagement latch from the disengaged configuration to the engaged configuration responsive to the alignment sensor detecting the payload in the coupling position.

C19. The payload transfer system of any of paragraphs C14-C18, when dependent from paragraph C12, wherein the automated controller is configured to direct the retainer actuator to transition each docking receptor unit from the unlocked configuration to the locked configuration responsive to the position sensor detecting the vehicle in the docked position.

C20. The payload transfer system of any of paragraphs C14-C19, when dependent from paragraph C4, wherein the automated controller is configured to guide the loader between the loading area and the payload storage area.

C21. The payload transfer system of paragraph C20, when dependent from paragraph C13, wherein the automated controller is configured to guide the loader between the loading area and the payload storage area responsive to the location sensor determining a position of the loader.

C22. The payload transfer system of any of paragraphs C1-C21, wherein the vehicle is at least one of an aircraft, a land-based vehicle, a water vehicle, a submersible water vehicle, and a space vehicle.

C23. The payload transfer system of paragraph C22, wherein the vehicle is an unmanned aerial vehicle (UAV).

C24. The payload transfer system of paragraph C23, wherein the UAV is a remotely piloted UAV.

C25. The payload transfer system of paragraph C23, wherein the UAV is an autonomously controlled UAV.

C26. The payload transfer system of any of paragraphs C22-C25, wherein the vehicle is a rotorcraft with at least one rotor.

C27. The payload transfer system of paragraph C26, wherein the at least one rotor includes one of two rotors, three rotors, four rotors, and more than four rotors.

C28. The payload transfer system of any of paragraphs C1-C27, wherein each engagement latch is positioned on an underside of the vehicle; and wherein the alignment plane is at least substantially parallel to an undersurface of the vehicle.

C29. The payload transfer system of any of paragraphs C1-C28, wherein the vehicle includes at least one thrust generator configured to propel the vehicle away from the docking platform.

C30. The payload transfer system of paragraph C29, wherein the vehicle is a/the rotorcraft with a/the at least one rotor, and wherein each rotor of the at least one rotor is the thrust generator.

C31. The payload transfer system of any of paragraphs C1-C30, wherein the payload includes a payload container configured to selectively contain an object.

C32. The payload transfer system of any of paragraphs C1-C31, wherein the payload includes a plurality of stacking legs disposed on an underside of the payload and configured to facilitate stacking the payload on top of an identical payload.

C33. The payload transfer system of any of paragraphs C1-C32, wherein the payload has a volume that is at least one of at least 10 liters (L), at least 50 L, at least 100 L, at least 500 L, at least 1,000 L, at least 5,000 L, at least 10,000 L, at least 50,000 L, at most 100,000 L, at most 70,000 L, at most 20,000 L, at most 7,000 L, at most 2,000 L, at most 700 L, at most 200 L, at most 70 L, and at most 20 L.

C34. The payload transfer system of any of paragraphs C1-C33, wherein the payload has a mass that is at least one of at least 1 kilogram (kg), at least 5 kg, at least 10 kg, at least 50 kg, at least 100 kg, at least 500 kg, at least 1,000 kg, at most 1,500 kg, at most 700 kg, at most 200 kg, at most 70 kg, at most 20 kg, at most 7 kg, and at most 2 kg.

D1. A method of utilizing a payload engagement system to selectively couple a payload to a vehicle, the method comprising:

positioning the vehicle on a first side of a docking platform;

guiding the payload toward the vehicle from a second side of the docking platform, which is opposite the first side of the docking platform, to position the payload in a predetermined coupling position relative to the vehicle; and coupling the payload to the vehicle;

wherein the vehicle includes at least one engagement latch; wherein the payload includes at least one engagement receptor; wherein, when the payload is in the coupling position relative to the vehicle, each engagement receptor is in alignment with a corresponding engagement latch of the at least one engagement latch within an alignment plane; and wherein the coupling the payload to the vehicle includes transitioning each engagement latch from a disengaged configuration, in which the engagement latch is removed from each engagement receptor, to an engaged configuration, in which each engagement latch engages a corresponding engagement receptor of the at least one engagement receptor.

D2. The method of paragraph D1, wherein the payload engagement system is the payload engagement system of any of paragraphs A1-A31.

D3. The method of any of paragraphs D1-D2, wherein the guiding the payload toward the vehicle includes guiding with a loader that is configured to transfer the payload to the vehicle.

D4. The method of paragraph D3, wherein the loader is the loader of any of paragraphs C2-C34.

D5. The method of any of paragraphs D3-D4, wherein the loader is located in a/the loading area relative to the docking platform that is at least substantially on the second side of the docking platform when the loader guides the payload toward the vehicle.

D6. The method of any of paragraphs D3-D5, wherein the method further includes, prior to the guiding the payload toward the vehicle, obtaining the payload with the loader.

D7. The method of paragraph D6, wherein the obtaining the payload includes obtaining the payload from a/the payload storage area and carrying the payload from the payload storage area to the loading area.

D8. The method of paragraph D7, wherein the carrying the payload includes guiding the loader to the loading area with a/the automated controller.

D9. The method of any of paragraphs D3-D8, wherein the guiding the payload includes translating a/the support surface of the loader toward the vehicle along a/the transverse direction.

D10. The method of any of paragraphs D1-D9, wherein the guiding the payload includes translating the payload to a/the coupling position relative to the vehicle.

D11. The method of any of paragraphs D1-D10, wherein the transitioning each engagement latch from the disengaged configuration to the engaged configuration includes translating each engagement latch in a lateral direction that is at least substantially parallel to the alignment plane.

D12. The method of any of paragraphs D1-D11, wherein the guiding the payload toward the vehicle includes passively guiding the payload to the coupling position with an alignment guide.

D13. The method of paragraph D12, wherein the vehicle includes the alignment guide.

D14. The method of any of paragraphs D12-D13, wherein the payload includes a plurality of corners; wherein the alignment guide includes a plurality of corner units, each corner unit having a ramped portion; and wherein the guiding the payload toward the vehicle includes the passively guiding the payload toward the coupling position by engaging each corner of the payload with the ramped portion of a corresponding corner unit of the plurality of corner units.

D15. The method of any of paragraphs D1-D14, wherein the transitioning each engagement latch from the disengaged configuration to the engaged configuration is performed responsive to an alignment sensor detecting that the payload is in the coupling position such that each engagement receptor is in alignment with the corresponding engagement latch.

D16. The method of any of paragraphs D1-D15, wherein the method further includes transitioning each engagement latch to a secured configuration to secure the payload to the vehicle.

D17. The method of paragraph D16, wherein the transitioning each engagement latch to the secured configuration includes translating each engagement latch in a transverse direction that is at least substantially perpendicular to the alignment plane.

D18. The method of any of paragraphs D16-D17, wherein the transitioning each engagement latch to the secured configuration is performed subsequent to the transitioning each engagement latch from the disengaged configuration to the engaged configuration.

D19. The method of any of paragraphs D1-D18, wherein the at least one engagement receptor includes a first engagement receptor and a second engagement receptor; wherein the first engagement receptor and the second engagement receptor are positioned in a spaced-apart arrangement on the payload; wherein the at least one engagement latch includes a first engagement latch configured to engage the first engagement receptor and a second engagement latch configured to engage the second engagement receptor; wherein the first engagement latch and the second engagement latch are spaced apart from each other such that the first engagement latch engages the first engagement receptor and the second engagement latch engages the second engagement receptor when each engagement latch is in the engaged configuration; and wherein the transitioning each engagement latch from the disengaged configuration to the engaged configuration includes translating the first engagement latch and the second engagement latch toward each other.

E1. A method of utilizing a vehicle docking system to selectively retain a vehicle in a docked position relative to a docking platform, the method comprising:

bringing the vehicle to the docked position relative to the docking platform; and securing the vehicle in the docked position;

wherein the docking platform includes a plurality of docking receptor units having a geometric arrangement; wherein the vehicle includes a plurality of docking insert units having a geometric arrangement corresponding to the geometric arrangement of the plurality of docking receptor units; wherein, when the vehicle is in the docked position, each docking insert unit of the plurality of docking insert units is received in a corresponding docking receptor unit of the plurality of docking receptor units to maintain the vehicle in the docked position; wherein the securing the vehicle in the docked position includes transitioning each docking receptor unit from an unlocked configuration, in which a corresponding docking insert unit of the plurality of docking insert units is free to be inserted into and removed from the docking receptor unit, to a locked configuration, in which the corresponding docking insert unit is restricted from being removed from the docking receptor unit when the vehicle is in the docked position.

E2. The method of paragraph E1, wherein the vehicle docking system is the vehicle docking system of any of paragraphs B1-B18.

E3. The method of any of paragraphs E1-E2, wherein the bringing the vehicle to the docked position includes coarsely aligning each docking insert unit with the corresponding docking receptor unit and subsequently passively guiding the vehicle to the docked position.

E4. The method of paragraph E3, wherein the coarsely aligning includes guiding the vehicle toward the docking platform with a/the automated controller.

E5. The method of any of paragraphs E3-E4, wherein the passively guiding includes engaging each docking insert unit with the corresponding docking receptor unit to bring the vehicle to the docked position.

E6. The method of paragraph E5, wherein each docking receptor unit includes an insert receiver that is configured to receive and guide a corresponding docking insert unit of the plurality of docking insert units into alignment with the docking receptor unit while the vehicle approaches the docked position, wherein each insert receiver includes a sloped portion configured to engage the corresponding docking insert unit to passively guide the corresponding docking insert unit into the docking receptor unit, and wherein the passively guiding includes engaging each docking insert unit with the sloped portion of the insert receiver of the corresponding docking receptor unit.

E7. The method of any of paragraphs E1-E6, wherein the transitioning each docking receptor unit from the unlocked configuration to the locked configuration includes rotating at least one insert retainer to restrict a corresponding docking insert unit of the plurality of docking insert units from being removed from the docking receptor unit.

E8. The method of any of paragraphs E1-E7, wherein the method further includes, subsequent to the transitioning each docking receptor unit from the unlocked configuration to the locked configuration, launching the vehicle from the docking platform.

E9. The method of paragraph E8, wherein the vehicle includes at least one thrust generator configured to propel the vehicle, and wherein the launching includes:

(i) generating thrust with each thrust generator away from the docking platform; and (ii) transitioning each docking receptor unit from the locked configuration to the unlocked configuration.

E10. The method of paragraph E9, wherein the generating thrust is performed prior to the transitioning each docking receptor unit from the locked configuration to the unlocked configuration.

E11. The method of paragraph E9, wherein the generating thrust is performed subsequent to the transitioning each docking receptor unit from the locked configuration to the unlocked configuration.

E12. The method of any of paragraphs E9-E11, wherein the transitioning each docking receptor unit from the locked configuration to the unlocked configuration includes transitioning each docking receptor unit from the locked configuration to the unlocked configuration simultaneously.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A vehicle docking system for selectively retaining a vehicle in a docked position relative to a docking platform, comprising:
    a vehicle that includes landing gear having an associated plurality of docking insert units in a geometric arrangement;
    a docking platform that includes a plurality of docking receptor units; and
    at least one insert retainer associated with a corresponding docking receptor unit of the plurality of docking receptor units;
    wherein each docking receptor unit is configured to selectively engage a corresponding docking insert unit of the plurality of docking insert units to selectively retain the vehicle in a docked position relative to the docking platform; wherein the plurality of docking receptor units has a geometric arrangement corresponding to the geometric arrangement of the plurality of docking insert units;
    wherein, when the vehicle is in the docked position, each docking insert unit is received in a corresponding docking receptor unit to maintain the vehicle in the docked position; wherein each docking receptor unit is configured to transition between an unlocked configuration, in which the corresponding docking insert unit is free to be inserted into and removed from the docking receptor unit, and a locked configuration, in which the corresponding docking insert unit is restricted from being removed from the docking receptor unit when the vehicle is in the docked position; wherein the at least one insert retainer is configured to selectively restrict a corresponding docking insert unit of the plurality of docking insert units from being removed from the corresponding docking receptor unit when the vehicle is in the docked position and when the docking receptor unit is in the locked configuration; wherein each insert retainer mechanically restricts the corresponding docking insert unit from being removed from the docking receptor unit when the vehicle is in the docked position and when the docking receptor unit is in the locked configuration; wherein each docking receptor unit includes a receptor opening, wherein each docking receptor unit is configured to receive the corresponding docking insert unit via the receptor opening; and wherein each insert retainer at least substantially covers the receptor opening of each docking receptor unit when the docking receptor unit is in the locked configuration.

2. The vehicle docking system of claim 1, wherein each insert retainer is hingedly coupled to the corresponding docking receptor unit, and wherein the vehicle docking system further includes a retainer actuator configured to pivot each insert retainer relative to the corresponding docking receptor unit to mechanically restrict the corresponding docking insert unit from being removed from each docking receptor unit when the vehicle is in the docked position and when the docking receptor unit is in the locked configuration.

3. The vehicle docking system of claim 2, wherein the vehicle docking system further includes a position sensor configured to detect when the vehicle is in the docked position, and wherein the retainer actuator is configured to pivot each insert retainer responsive to the position sensor detecting the vehicle in the docked position.

4. The vehicle docking system of claim 1, wherein each docking receptor unit includes an insert receiver that is configured to receive and guide a corresponding docking insert unit of the plurality of docking insert units into alignment with the docking receptor unit while the vehicle approaches the docked position.

5. The vehicle docking system of claim 4, wherein each docking insert unit is at least substantially enclosed by the insert receiver of the corresponding docking receptor unit when the vehicle is in the docked position.

6. The vehicle docking system of claim 4, wherein each docking insert unit is at least substantially conical, wherein the insert receiver of each docking receptor unit is at least substantially conical, and wherein the insert receiver of each docking receptor unit includes a sloped portion configured to engage the corresponding docking insert unit to passively guide the corresponding docking insert unit into the docking receptor unit.

7. The vehicle docking system of claim 1, wherein the landing gear is configured to support the vehicle upon a ground surface, and wherein the landing gear includes each docking insert unit.

8. The vehicle docking system of claim 1, wherein the vehicle is an autonomously controlled unmanned aerial vehicle (UAV).

9. A method of utilizing the vehicle docking system of claim 1 to selectively retain a vehicle in a docked position relative to a docking platform, the method comprising:
    bringing the vehicle to the docked position relative to the docking platform; and
    securing the vehicle in the docked position;
    wherein the securing the vehicle in the docked position includes transitioning each docking receptor unit from the unlocked configuration to the locked configuration.

10. The method of claim 9, wherein the bringing the vehicle to the docked position includes coarsely aligning each docking insert unit with the corresponding docking receptor unit and subsequently passively guiding the vehicle to the docked position.

11. The method of claim 10, wherein the coarsely aligning includes guiding the vehicle toward the docking platform with an automated controller.

12. The method of claim 10, wherein the passively guiding includes engaging each docking insert unit with the corresponding docking receptor unit to bring the vehicle to the docked position.

13. The method of claim 9, wherein the vehicle docking system includes at least one insert retainer associated with a corresponding docking receptor unit of the plurality of docking receptor units; and wherein the transitioning each docking receptor unit from the unlocked configuration to the locked configuration includes rotating the at least one insert retainer to restrict a corresponding docking insert unit of the plurality of docking insert units from being removed from the docking receptor unit.

14. The method of claim 9, wherein the method further includes, subsequent to the transitioning each docking receptor unit from the unlocked configuration to the locked configuration, launching the vehicle from the docking platform.

15. The method of claim 14, wherein the vehicle includes a thrust generator configured to propel the vehicle, and wherein the launching includes:
(i) generating thrust with the thrust generator away from the docking platform; and
(ii) transitioning each docking receptor unit from the locked configuration to the unlocked configuration;
wherein the generating thrust is performed prior to the transitioning each docking receptor unit from the locked configuration to the unlocked configuration.

16. The method of claim 15, wherein the transitioning each docking receptor unit from the locked configuration to the unlocked configuration includes transitioning each docking receptor unit from the locked configuration to the unlocked configuration simultaneously.

17. A payload transfer system for transferring a payload to a vehicle, the payload transfer system comprising:
a vehicle that includes at least one engagement latch and landing gear having an associated plurality of docking insert units in a geometric arrangement;
a payload that includes at least one engagement receptor;
a docking platform configured to selectively maintain the vehicle in a docked position relative to the docking platform and including a plurality of docking receptor units;
a vehicle docking system for selectively retaining the vehicle in the docked position relative to the docking platform; and
a payload engagement system for selectively coupling the payload to the vehicle;
wherein the vehicle docking system includes the plurality of docking insert units and the plurality of docking receptor units;
wherein each docking receptor unit is configured to selectively engage a corresponding docking insert unit of the plurality of docking insert units to selectively retain the vehicle in the docked position relative to the docking platform; wherein the plurality of docking receptor units has a geometric arrangement corresponding to the geometric arrangement of the plurality of docking insert units;
wherein, when the vehicle is in the docked position, each docking insert unit is received in a corresponding docking receptor unit to maintain the vehicle in the docked position; wherein each docking receptor unit is configured to transition between an unlocked configuration, in which the corresponding docking insert unit is free to be inserted into and removed from the docking receptor unit, and a locked configuration, in which the corresponding docking insert unit is restricted from being removed from the docking receptor unit when the vehicle is in the docked position;
wherein the payload engagement system includes the at least one engagement latch and the at least one engagement receptor;
wherein each engagement latch is configured to selectively engage a corresponding engagement receptor of the at least one engagement receptor to selectively couple the payload to the vehicle; wherein each engagement latch is configured to be selectively transitioned between an engaged configuration, in which each engagement latch engages the corresponding engagement receptor to couple the payload to the vehicle, and a disengaged configuration, in which each engagement latch is removed from each engagement receptor; wherein the payload engagement system is configured to guide the payload to a predetermined coupling position relative to the vehicle to establish alignment of each engagement latch relative to the corresponding engagement receptor in an alignment plane prior to each engagement latch transitioning from the disengaged configuration to the engaged configuration; and wherein each engagement latch is configured to translate in a lateral direction that is at least substantially parallel to the alignment plane as the engagement latch transitions between the engaged configuration and the disengaged configuration.

18. The payload transfer system of claim 17, wherein the vehicle is an autonomously controlled unmanned aerial vehicle (UAV); wherein the landing gear includes the plurality of docking insert units; wherein the plurality of docking insert units includes four docking insert units positioned in a rectangular geometric arrangement; wherein the plurality of docking receptor units includes four docking receptor units positioned in a rectangular geometric arrangement; wherein the at least one engagement receptor includes a first engagement receptor and a second engagement receptor; wherein the first engagement receptor and the second engagement receptor are positioned in a spaced-apart arrangement on the payload; wherein the at least one engagement latch includes a first engagement latch configured to engage the first engagement receptor and a second engagement latch configured to engage the second engagement receptor; and wherein the first engagement latch and the second engagement latch are spaced apart from each other such that the first engagement latch engages the first engagement receptor and the second engagement latch engages the second engagement receptor when each engagement latch is in the engaged configuration.

19. A vehicle docking system for selectively retaining a vehicle in a docked position relative to a docking platform, comprising:
a vehicle that includes landing gear having an associated plurality of docking insert units in a geometric arrangement;
a docking platform that includes a plurality of docking receptor units;

at least one insert retainer associated with a corresponding docking receptor unit of the plurality of docking receptor units, wherein each insert retainer is hingedly coupled to the corresponding docking receptor unit; and a retainer actuator configured to pivot each insert retainer relative to the corresponding docking receptor unit;

wherein each docking receptor unit is configured to selectively engage a corresponding docking insert unit of the plurality of docking insert units to selectively retain the vehicle in a docked position relative to the docking platform; wherein the plurality of docking receptor units has a geometric arrangement corresponding to the geometric arrangement of the plurality of docking insert units;

wherein, when the vehicle is in the docked position, each docking insert unit is received in a corresponding docking receptor unit to maintain the vehicle in the docked position; wherein each docking receptor unit is configured to transition between an unlocked configuration, in which the corresponding docking insert unit is free to be inserted into and removed from the docking receptor unit, and a locked configuration, in which the corresponding docking insert unit is restricted from being removed from the docking receptor unit when the vehicle is in the docked position; wherein the at least one insert retainer is configured to selectively restrict a corresponding docking insert unit of the plurality of docking insert units from being removed from the corresponding docking receptor unit when the vehicle is in the docked position and when the docking receptor unit is in the locked configuration;

wherein each insert retainer mechanically restricts the corresponding docking insert unit from being removed from the docking receptor unit when the vehicle is in the docked position and when the docking receptor unit is in the locked configuration; and wherein the retainer actuator is configured to pivot each insert retainer relative to the corresponding docking receptor unit to mechanically restrict the corresponding docking insert unit from being removed from each docking receptor unit when the vehicle is in the docked position and when the docking receptor unit is in the locked configuration.

20. The vehicle docking system of claim 19, wherein the retainer actuator is configured to pivot each insert retainer relative to the corresponding docking receptor unit about a horizontal axis.

* * * * *